United States Patent
Bertrand et al.

(10) Patent No.: US 12,379,805 B2
(45) Date of Patent: Aug. 5, 2025

(54) SCREEN DETECTION WITH A CAPACITANCE MODULE

(71) Applicant: Cirque Corporation, Sandy, UT (US)

(72) Inventors: Jon Bertrand, Taylorsville, UT (US); Todd Rich, Riverton, UT (US)

(73) Assignee: Cirque Corporation, Sandy, UT (US)

( * ) Notice: Subject to any disclaimer, the term of this patent is extended or adjusted under 35 U.S.C. 154(b) by 0 days.

(21) Appl. No.: 18/734,395

(22) Filed: Jun. 5, 2024

(65) Prior Publication Data
US 2024/0427448 A1    Dec. 26, 2024

Related U.S. Application Data

(63) Continuation of application No. 18/213,973, filed on Jun. 26, 2023, now Pat. No. 12,032,771.

(51) Int. Cl.
*G06F 3/041*    (2006.01)
*G06F 3/044*    (2006.01)

(52) U.S. Cl.
CPC ........ *G06F 3/04162* (2019.05); *G06F 3/0446* (2019.05); *G06F 2203/04107* (2013.01)

(58) Field of Classification Search
CPC ............... G06F 3/04162; G06F 3/0446; G06F 2203/04107
See application file for complete search history.

(56) References Cited

U.S. PATENT DOCUMENTS

| | | | |
|---|---|---|---|
| 7,428,142 B1 | 9/2008 | Ligtenberg | |
| 10,547,716 B2 | 1/2020 | Jeon | |
| 2009/0016003 A1* | 1/2009 | Ligtenberg | G06F 1/1616 |
| | | | 361/679.26 |
| 2020/0201480 A1* | 6/2020 | Choi | G06F 3/04162 |

* cited by examiner

*Primary Examiner* — Lisa S Landis

(57) ABSTRACT

An electronic device may include a first part; a second part may be movably connected to the second part; a first capacitance electrode incorporated into the first part; a second capacitance electrode incorporated into the second part; a controller in communication with the first capacitance electrode, the second capacitance electrode, or combinations thereof; memory in communication with the controller; and programmed instructions stored in the memory and configured, when executed, to cause the controller to broadcast a signal with the first capacitance electrode; and detect with the broadcasted signal with the second capacitance electrode.

18 Claims, 17 Drawing Sheets

SCREEN DETECTION WITH A CAPACITANCE MODULE

CROSS REFERENCE TO RELATED APPLICATIONS

The present Application is a Continuation of U.S. patent application Ser. No. 18/213,973 by Jon Bertrand et al entitled "Screen Detection with a Capacitance Module," filed on Jun. 26, 2023. U.S. patent application Ser. No. 18/213,973 is assigned to the assignee hereof and is expressly incorporated by reference herein.

FIELD OF THE DISCLOSURE

This disclosure relates generally to systems and methods for detecting a display component using a capacitance module. In particular, this disclosure relates to systems and methods for detecting when a display component in the lid of a laptop or another type of electronic device is closed by detecting whether the location of the display component is adjacent to a capacitance module.

BACKGROUND

A display screen is often incorporated into laptop computers, mobile devices, electronic device, and other types of devices to provide a mechanism for displaying visual output. A laptop may be closed and opened and the state of being closed or opened may be detected.

An example of a lid closure detecting device is disclosed in U.S. Patent No. 2009/0016003 issued to Chris Ligtenberg, et al. This reference discloses a portable computer having a display assembly coupled to a base assembly to alternate between a closed position and an open position. An input device disposed on the base assembly senses a contact with a portion of the display assembly to detect the display assembly in the closed position.

Another example of a lid closure detecting device is disclosed in U.S. Pat. No. 7,428,142 issued to Chris Ligtenberg, et al. This reference discloses a portable computer having a display assembly coupled to a base assembly to alternate between a closed position and an open position. An input device disposed on the base assembly senses a contact with a portion of the display assembly to detect the display assembly in the closed position.

Each of these references are herein incorporated by reference for all that they disclose.

SUMMARY

In one embodiment, a capacitance module may include at least one capacitance electrode; a controller in communication with the electrode; memory in communication with the controller; and programmed instructions stored in the memory and configured, when executed, to cause the controller to detect with at least one capacitance electrode a broadcasted signal from an electronic display component.

The display component may have a capacitance electrode.

The capacitance electrode of the display component may be part of a touch module.

At least one capacitance electrode may be a sense electrode.

The capacitance module may have at least one transmit electrode and programmed instructions may cause the controller, when executed, to deactivate at least one transmit electrode during a time period to detect the broadcasted signal.

The broadcasted signal from the electronic display component may be electrical noise.

The broadcasted signal may be generated from a pixel refresh pattern of the electronic display component At least one capacitance electrode may be driven at a base frequency above 100 kilohertz.

The programmed instructions may cause the controller, when executed, to tune at least one sense electrode to a determined frequency and drive at least one transmit electrode at the determined frequency, where the determined frequency has at least one property of the broadcasted signal from the display component.

The detected broadcasted signal may be an authentication signal.

The programmed instructions may cause the controller, when executed, to determine a location of the electronic display component based, at least in part, on the broadcasted signal.

The programmed instructions may cause the controller, when executed, to change a power management setting in response to the determined location of the electronic display component.

A computer-program product, the computer-program product may include a non-transitory computer-readable medium storing instructions executable with a controller to receive, from a capacitance electrode, a detected broadcasted signal from an electronic display component and execute a response in response to receiving the detected broadcasted signal.

The capacitance electrode may be part of a capacitance module.

The broadcasted signal may be generated from a pixel refresh pattern of the electronic display component.

A method may include receiving, from a capacitance electrode, a detected broadcasted signal from an electronic display component and executing a response in response to receiving the detected broadcasted signal.

The broadcasted signal may be generated from a touch electrode of the electronic display component.

An electronic device may include a first part; a second part may be movably connected to the second part; a first capacitance electrode incorporated into the first part; a second capacitance electrode incorporated into the second part; a controller in communication with the first capacitance electrode, the second capacitance electrode, or combinations thereof; memory in communication with the controller; and programmed instructions stored in the memory and configured, when executed, to cause the controller to broadcast a signal with the first capacitance electrode; and detect with the broadcasted signal with the second capacitance electrode.

The programmed instructions may be further configured, when executed, to determine a position of the first part and the second part relative to each other.

The programmed instructions may be further configured, when executed, to change a power setting of the electronic device in response to detecting the broadcasted signal.

The first capacitance electrode may be incorporated into a touch display.

The first capacitance electrode may be incorporated into a capacitance module of a touch pad.

The first part may be movably connected to the second part with hinged connection.

The first capacitance electrode may be incorporated into a touch display of the electronic device, and the second capacitance electrode may be incorporated into a capacitance module associated with a touch pad of the electronic device.

The first capacitance electrode may be incorporated into a capacitance module associated with a touch pad of the electronic device, and the second capacitance electrode may be incorporated into a touch display of the electronic device.

The first capacitance electrode may be incorporated into a first portion of a touch display of the electronic device, and the second capacitance electrode may be incorporated into a second portion of a touch display of the electronic device.

The first capacitance electrode may be incorporated into a first touch display of the electronic device, and the second capacitance electrode may be incorporated into a second touch display of the electronic device.

A computer-program product, the computer-program product may include a non-transitory computer-readable medium storing instructions executable with a controller to receive an input from a first capacitance module where the input represents a detected broadcasted signal from a second capacitance module; and execute a response in response to receiving the input representing the detected broadcasted signal.

The programmed instructions may be further configured, when executed, to determine a position of a first part of an electronic device containing the first capacitance electrode and a second part of the electronic device containing the second capacitance electrode relative to each other.

The first part may be movably connected to the second part with hinged connection.

The first capacitance electrode may be incorporated into a touch display.

The first capacitance electrode may be incorporated into a capacitance module of a touch pad.

The programmed instructions may be further configured, when executed, to change a power setting of an electronic device containing the second capacitance electrode in response to detecting the broadcasted signal.

A method of detecting a broadcasted signal may include receiving an input from a first capacitance module where the input represents a detected broadcasted signal from a second capacitance module; and executing a response in response to receiving the input representing the detected broadcasted signal.

The method may include determining a position of a first part of an electronic device containing the first capacitance electrode and a second part of the electronic device containing the second capacitance electrode relative to each other.

The method may include changing a power setting of an electronic device containing the second capacitance electrode in response to detecting the broadcasted signal.

Changing the power setting of the electronic device may include turning off the electronic device.

Figure 1:
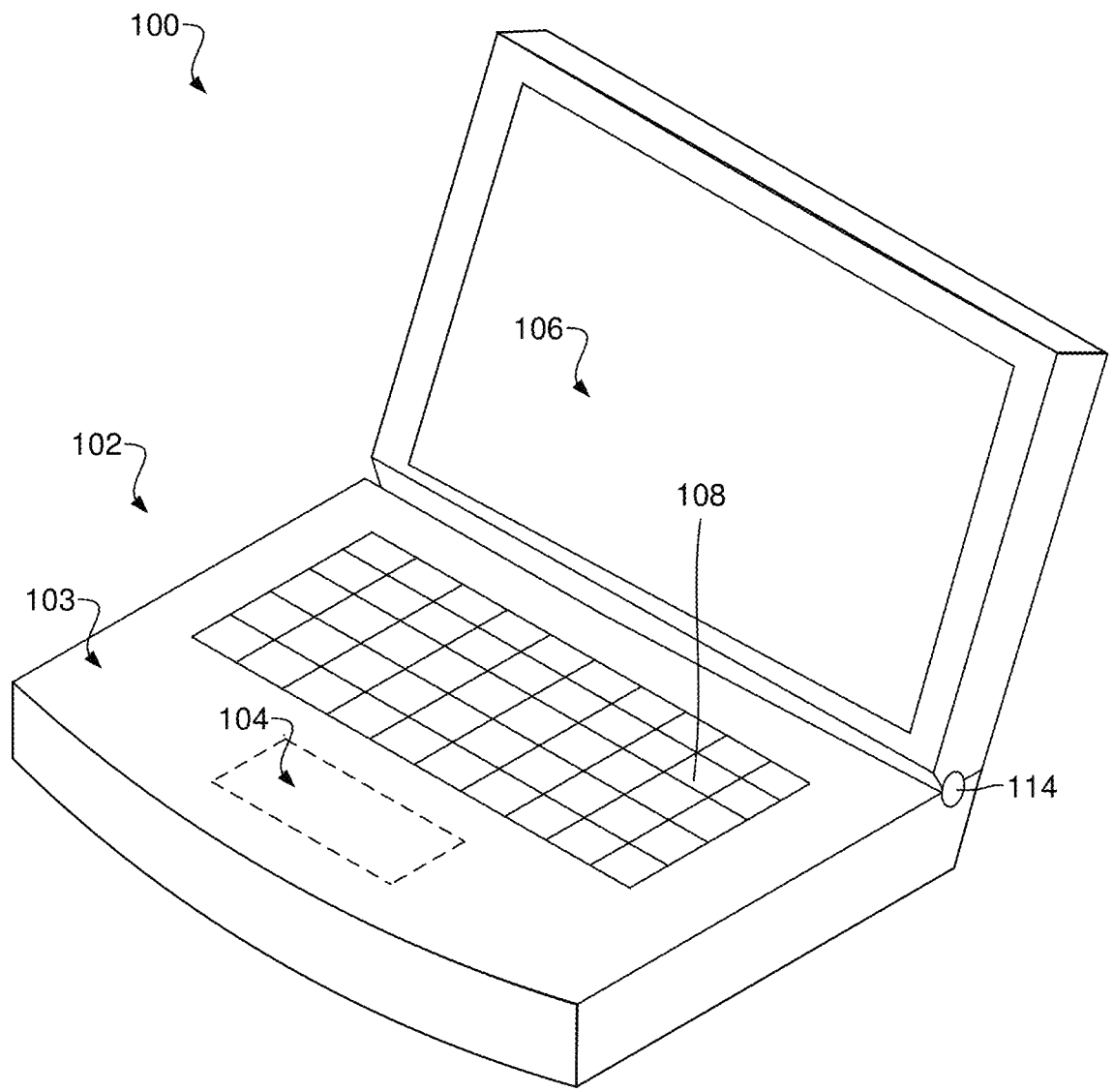
FIG. 1 depicts an example of an electronic device in accordance with the disclosure.

While the disclosure is susceptible to various modifications and alternative forms, specific embodiments have been shown by way of example in the drawings and will be described in detail herein. However, it should be understood that the disclosure is not intended to be limited to the particular forms disclosed. Rather, the intention is to cover all modifications, equivalents and alternatives falling within the spirit and scope of the invention as defined by the appended claims.

DETAILED DESCRIPTION OF THE INVENTION

This description provides examples, and is not intended to limit the scope, applicability or configuration of the invention. Rather, the ensuing description will provide those skilled in the art with an enabling description for implementing embodiments of the invention. Various changes may be made in the function and arrangement of elements.

Thus, various embodiments may omit, substitute, or add various procedures or components as appropriate. For instance, it should be appreciated that the methods may be performed in an order different than that described, and that various steps may be added, omitted, or combined. Also, aspects and elements described with respect to certain embodiments may be combined in various other embodiments. It should also be appreciated that the following systems, methods, devices, and software may individually or collectively be components of a larger system, wherein other procedures may take precedence over or otherwise modify their application.

For purposes of this disclosure, the term "aligned" generally refers to being parallel, substantially parallel, or forming an angle of less than 35.0 degrees. For purposes of this disclosure, the term "transverse" generally refers to perpendicular, substantially perpendicular, or forming an angle between 55.0 and 125.0 degrees. For purposes of this disclosure, the term "length" generally refers to the longest dimension of an object. For purposes of this disclosure, the term "width" generally refers to the dimension of an object from side to side and may refer to measuring across an object perpendicular to the object's length.

For purposes of this disclosure, the term "electrode" may generally refer to a portion of an electrical conductor intended to be used to make a measurement, and the terms "route" and "trace" generally refer to portions of an electrical conductor that are not intended to make a measurement. For purposes of this disclosure in reference to circuits, the term "line" generally refers to the combination of an electrode and a "route" or "trace" portions of the electrical conductor. For purposes of this disclosure, the term "Tx" generally refers to a transmit line, electrode, or portions thereof, and the term "Rx" generally refers to a sense line, electrode, or portions thereof.

For the purposes of this disclosure, the term "electronic device" may generally refer to devices that can be transported and include a battery and electronic components. Examples may include a laptop, a desktop, a mobile phone, an electronic tablet, a personal digital device, a watch, a gaming controller, a gaming wearable device, a wearable device, a measurement device, an automation device, a security device, a display, a computer mouse, a vehicle, an infotainment system, an audio system, a control panel, another type of device, an athletic tracking device, a tracking device, a card reader, a purchasing station, a kiosk, or combinations thereof.

It should be understood that use of the terms "capacitance module," "touch pad" and "touch sensor" throughout this document may be used interchangeably with "capacitive touch sensor," "capacitive sensor," "capacitance sensor," "capacitive touch and proximity sensor," "proximity sensor," "touch and proximity sensor," "touch panel," "trackpad," "touch pad," and "touch screen." The capacitance module may be incorporated into an electronic device.

It should also be understood that, as used herein, the terms "vertical," "horizontal," "lateral," "upper," "lower," "left," "right," "inner," "outer," etc., can refer to relative directions or positions of features in the disclosed devices and/or assemblies shown in the Figures. For example, "upper" or "uppermost" can refer to a feature positioned closer to the top of a page than another feature. These terms, however, should be construed broadly to include devices and/or assemblies having other orientations, such as inverted or inclined orientations where top/bottom, over/under, above/below, up/down, and left/right can be interchanged depending on the orientation.

In some cases, the capacitance module is located within a housing. The capacitance module may be underneath the housing and capable of detecting objects outside of the housing. In examples, where the capacitance module can detect changes in capacitance through a housing, the housing is a capacitance reference surface. For example, the capacitance module may be disclosed within a cavity formed by a keyboard housing of a computer, such as a laptop or other type of computing device, and the sensor may be disposed underneath a surface of the keyboard housing. In such an example, the keyboard housing adjacent to the capacitance module is the capacitance reference surface. In some examples, an opening may be formed in the housing, and an overlay may be positioned within the opening. In this example, the overlay is the capacitance reference surface. In such an example, the capacitance module may be positioned adjacent to a backside of the overlay, and the capacitance module may sense the presence of the object through the thickness of the overlay. For the purposes of this disclosure, the term "reference surface" may generally refer to a surface through which a pressure sensor, a capacitance sensor, or another type of sensor is positioned to sense a pressure, a presence, a position, a touch, a proximity, a capacitance, a magnetic property, an electric property, another type of property, or another characteristic, or combinations thereof that indicates an input. For example, the reference surface may be a housing, an overlay, or another type of surface through which the input is sensed. In some examples, the reference surface has no moving parts. In some examples, the reference surface may be made of any appropriate type of material, including, but not limited to, plastics, glass, a dielectric material, a metal, another type of material, or combinations thereof.

For the purposes of this disclosure, the term "display" may generally refer to a display or screen that is not depicted in the same area as the capacitive reference surface. In some cases, the display is incorporated into a laptop where a keyboard is located between the display and the capacitive reference surface. In some examples where the capacitive reference surface is incorporated into a laptop, the capacitive reference surface may be part of a touch pad. Pressure sensors may be integrated into the stack making up the capacitance module. However, in some cases, the pressure sensors may be located at another part of the laptop, such as under the keyboard housing, but outside of the area used to sense touch inputs, on the side of the laptop, above the keyboard, to the side of the keyboard, at another location on the laptop, or at another location. In examples where these principles are integrated into a laptop, the display may be pivotally connected to the keyboard housing. The display may be a digital screen, a touch screen, another type of screen, or combinations thereof. In some cases, the display is located on the same device as the capacitive reference surface, and in other examples, the display is located on another device that is different from the device on which the capacitive reference surface is located. For example, the display may be projected onto a different surface, such as a wall or projector screen. In some examples, the reference surface may be located on an input or gaming controller, and the display is located on a wearable device, such as a virtual reality or augmented reality screen. In some cases, the reference surface and the display are located on the same surface, but on separate locations on that surface. In other examples, the reference surface and the display may be integrated into the same device, but on different surfaces. In some cases, the reference surface and the display may be oriented at different angular orientations with respect to each other.

For the purposes of this disclosure, the term "electrical noise" may generally refer to electrical signals that are broadcast by a system due to the standard operation of the system but are not the primary function of the system. In some examples, electrical noise may be broadcast from light emitting components of a display system. In some examples, the light emitting components may broadcast signals when an electrical signal is applied to them. In some examples, electrical noise may be broadcast from a capacitance module. In some examples, capacitance electrodes may broadcast electrical noise when an electrical signal is applied to them. In some examples, the electrical noise is caused by other electrical circuits that are incorporated into the display component, work with the display component, and/or are associated with the display component.

For the purposes of the disclosure, the term "base frequency" may generally refer to the main frequency at which a broadcasted signal is broadcasted. In some examples, the base frequency may influence, at least in part, the harmonic content of a signal. In some examples, a base frequency of a signal may be based, at least in part, on an alternating current (AC) frequency being applied to a component that broadcasts a signal. In some examples, the broadcasted signal is a noise signal. In some examples, the base frequency of a signal may be based, at least in part, on a combined signal from multiple sources. In some examples, the base frequency of a signal may be determined by the rate at which light emitting components of a display device are changed and/or are operated.

For the purposes of this disclosure, the term "power management setting" may generally refer to a setting on a device that controls how and/or how much electrical power is used for operation. In some examples, a power management setting may control if no power is being used by a device, how much power is being used by a device, which components of a device are using power, or a combination thereof. A device with a power management setting may be a laptop computer, a desktop computer, a smartphone device, a smartwatch device, a mobile device, an electronic tablet, or another electronic device, or combinations thereof. In some examples, the power management setting of a laptop computer may control when the computer is in sleep mode, turned on, turned off, in another mode of operation, or combinations thereof.

For the purposes of this disclosure, the term "authentication signal" may generally refer to a signal broadcasted from an electronic device that may be used to determine the identity of the device. In some examples, the authentication signal may have a specific frequency, amplitude, harmonic content, encryption method, data transmission method or combination thereof. In some examples, an authentication signal may be used to grant access to information, access physical spaces, perform some action, or perform another type of operation.

For the purposes of this disclosure, the term "pixel refresh pattern" may generally refer to the pattern, method, rate, or combination thereof that a display system uses to change or update light emitting components of the system. In some examples, the pixel refresh pattern of a display may be used to update the image or information displayed on the display. In some examples, the pixel refresh pattern may be the method and/or pattern at which a display applies an electrical signal to components of the display. In some examples, the pixel refresh pattern may have a certain frequency that can emit a signal with identifiable patterns.

For the purposes of this disclosure, the term "display component" may generally refer to component that is incorporated into a display of a device. For example, components of a display may include a pixel, a pixel layer, a touch circuit in a display with touch sensing capabilities, a touch sensor layer, a circuit, a bevel, glass, a substrate, a sensor, or another device that is incorporated into a display.

FIG. 1 depicts an example of an electronic device 100. In this example, the electronic device is a laptop. In the illustrated example, the electronic device 100 includes input components, such as a keyboard 102 and a capacitive module, such as a touch pad 104, that are incorporated into a housing 103. The electronic device 100 also includes a display 106. A program operated by the electronic device 100 may be depicted in the display 106 and controlled by a sequence of instructions that are provided by the user through the keyboard 102 and/or through the touch pad 104. An internal battery (not shown) may be used to power the operations of the electronic device 100.

The keyboard 102 includes an arrangement of keys 108 that can be individually selected when a user presses on a key with a sufficient force to cause the key 108 to be depressed towards a switch located underneath the keyboard 102. In response to selecting a key 108, a program may receive instructions on how to operate, such as a word processing program determining which types of words to process. A user may use the touch pad 104 to give different types of instructions to the programs operating on the computing device 100. For example, a cursor depicted in the display 106 may be controlled through the touch pad 104. A user may control the location of the cursor by sliding his or her hand along the surface of the touch pad 104. In some cases, the user may move the cursor to be located at or near an object in the computing device's display and give a command through the touch pad 104 to select that object. For example, the user may provide instructions to select the object by tapping the surface of the touch pad 104 one or more times.

The touch pad 104 is a capacitance module that includes a stack of layers disposed underneath the keyboard housing, underneath an overlay that is fitted into an opening of the keyboard housing, or underneath another capacitive reference surface. In some examples, the capacitance module is located in an area of the keyboard's surface where the user's palms may rest while typing. The capacitance module may include a substrate, such as a printed circuit board or another type of substrate. One of the layers of the capacitance module may include a sensor layer that includes a first set of electrodes oriented in a first direction and a second layer of electrodes oriented in a second direction that is transverse the first direction. These electrodes may be spaced apart and/or electrically isolated from each other. The electrical isolation may be accomplished by deposited at least a portion of the electrodes on different sides of the same substrate or providing dedicated substrates for each set of electrodes. Capacitance may be measured at the overlapping intersections between the different sets of electrodes. However, as an object with a different dielectric value than the surrounding air (e.g., finger, stylus, etc.) approach the intersections between the electrodes, the capacitance between the electrodes may change. This change in capacitance and the associated location of the object in relation to the capacitance module may be calculated to determine where the user is touching or hovering the object within the detection range of the capacitance module. In some examples, the first set of electrodes and the second set of electrodes are equidistantly spaced with respect to each other. Thus, in these examples, the sensitivity of the capacitance module is the same in both directions. However, in other examples, the distance between the electrodes may be non-uniformly spaced to provide greater sensitivity for movements in certain directions.

In some cases, the display 106 is mechanically separate and movable with respect to the keyboard with a connection mechanism 114. In these examples, the display 106 and keyboard 102 may be connected and movable with respect to one another. The display 106 may be movable within a range of 0 degrees to 180 degrees or more with respect to the keyboard 102. In some examples, the display 106 may fold over onto the upper surface of the keyboard 102 when in a closed position, and the display 106 may be folded away from the keyboard 102 when the display 106 is in an operating position. In some examples, the display 106 may be orientable with respect to the keyboard 102 at an angle between 35 to 135 degrees when in use by the user. However, in these examples, the display 106 may be positionable at any angle desired by the user.

In some examples, the display 106 may be a non-touch sensitive display. However, in other examples at least a portion of the display 106 is touch sensitive. In these examples, the touch sensitive display may also include a capacitance module that is located behind an outside surface of the display 106. As a user's finger or other object approaches the touch sensitive screen, the capacitance module may detect a change in capacitance as an input from the user.

While the example of FIG. 1 depicts an example of the electronic device being a laptop, the capacitance sensor and touch surface may be incorporated into any appropriate device. A non-exhaustive list of devices includes, but is not limited to, a desktop, a display, a screen, a kiosk, a computing device, an electronic tablet, a smart phone, a location sensor, a card reading sensor, another type of electronic device, another type of device, or combinations thereof.

Figure 2:
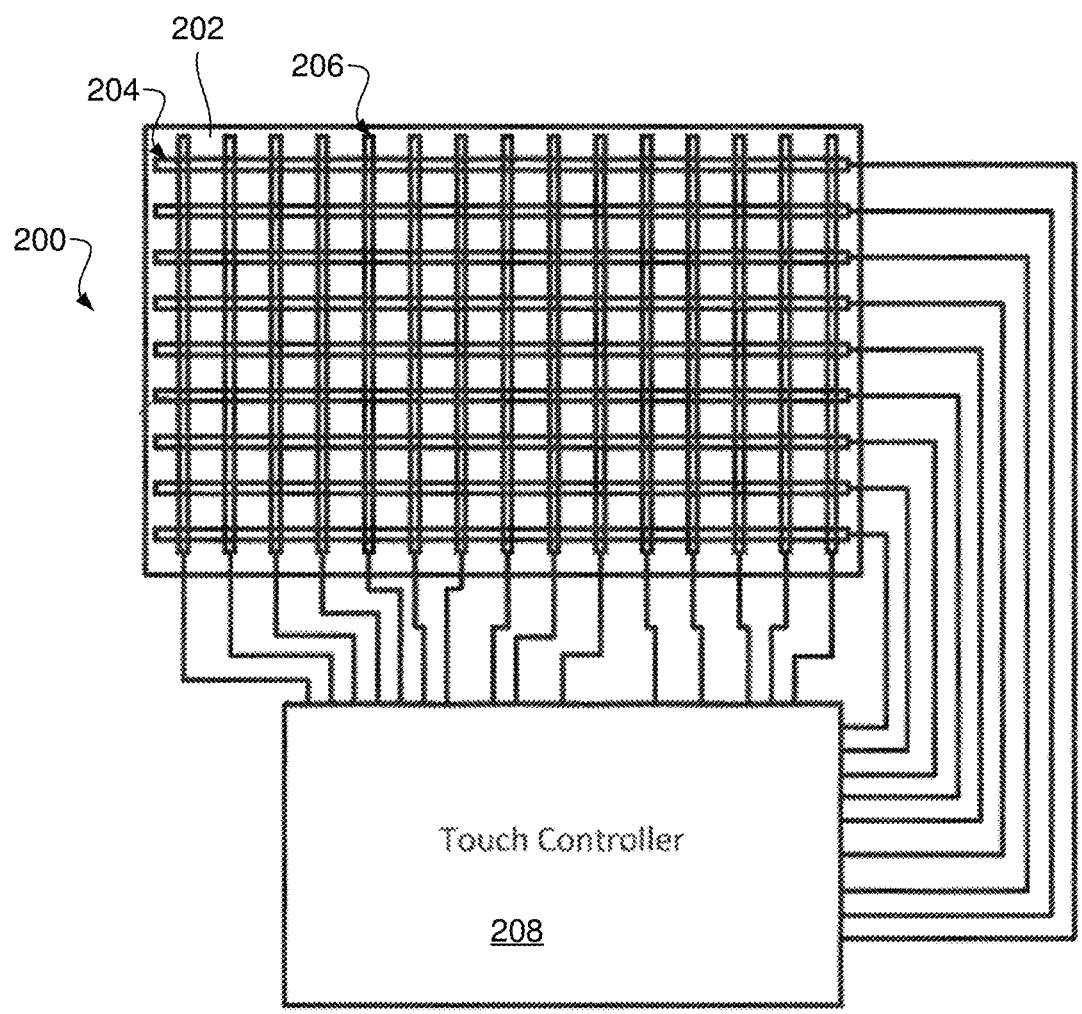
FIG. 2 depicts an example of a substrate with a first set of electrodes and a second set of electrodes in accordance with the disclosure.

FIG. 2 depicts an example of a portion of a capacitance module 200. In this example, the capacitance module 200 may include a substrate 202, first set 204 of electrodes, and a second set 206 of electrodes. The first and second sets 204, 206 of electrodes may be oriented to be transverse to each other. Further, the first and second sets 204, 206 of electrodes may be electrically isolated from one another so that the electrodes do not short to each other. However, where electrodes from the first set 204 overlap with electrodes from the second set 206, capacitance can be measured. The capacitance module 200 may include one or more electrodes in the first set 204 or the second set 206. Such a substrate 202 and electrode sets may be incorporated into a touch screen, a touch pad, a location sensor, a gaming controller, a button, and/or detection circuitry.

In some examples, the capacitance module 200 is a mutual capacitance sensing device. In such an example, the substrate 202 has a set 204 of row electrodes and a set 206 of column electrodes that define the touch/proximity-sensitive area of the component. In some cases, the component is configured as a rectangular grid of an appropriate number of electrodes (e.g., 8-by-6, 16-by-12, 9-by-15, or the like).

As shown in FIG. 2, the capacitance module 208 includes a capacitance controller 208. The capacitance controller 208 may include at least one of a central processing unit (CPU), a digital signal processor (DSP), an analog front end (AFE) including amplifiers, a peripheral interface controller (PIC), another type of microprocessor, and/or combinations thereof, and may be implemented as an integrated circuit, a field programmable gate array (FPGA), an application specific integrated circuit (ASIC), a combination of logic gate circuitry, other types of digital or analog electrical design components, or combinations thereof, with appropriate circuitry, hardware, firmware, and/or software to choose from available modes of operation.

In some cases, the capacitance controller 208 includes at least one multiplexing circuit to alternate which of the sets 204, 206 of electrodes are operating as drive electrodes and sense electrodes. The driving electrodes can be driven one at a time in sequence, or randomly, or drive multiple electrodes at the same time in encoded patterns. Other configurations are possible such as a self-capacitance mode where the electrodes are driven and sensed simultaneously. Electrodes may also be arranged in non-rectangular arrays, such as radial patterns, linear strings, or the like. A shield layer (see FIG. 3) may be provided beneath the electrodes to reduce noise or other interference. The shield may extend beyond the grid of electrodes. Other configurations are also possible.

In some cases, no fixed reference point is used for measurements. The touch controller 208 may generate signals that are sent directly to the first or second sets 204, 206 of electrodes in various patterns.

In some cases, the component does not depend upon an absolute capacitive measurement to determine the location of a finger (or stylus, pointer, or other object) on a surface of the capacitance module 200. The capacitance module 200 may measure an imbalance in electrical charge to the electrode functioning as a sense electrode which can, in some examples, be any of the electrodes designated in either set 204, 206 or, in other examples, with dedicated-sense electrodes. When no pointing object is on or near the capacitance module 200, the capacitance controller 208 may be in a balanced state, and there is no signal on the sense electrode. When a finger or other pointing object creates imbalance because of capacitive coupling, a change in capacitance may occur at the intersections between the sets of electrodes 204, 206 that make up the touch/proximity sensitive area. In some cases, the change in capacitance is measured. However, in alternative example, the absolute capacitance value may be measured.

While this example has been described with the capacitance module 200 having the flexibility of the switching the sets 204, 206 of electrodes between sense and transmit electrodes, in other examples, each set of electrodes is dedicated to either a transmit function or a sense function.

Figure 3:
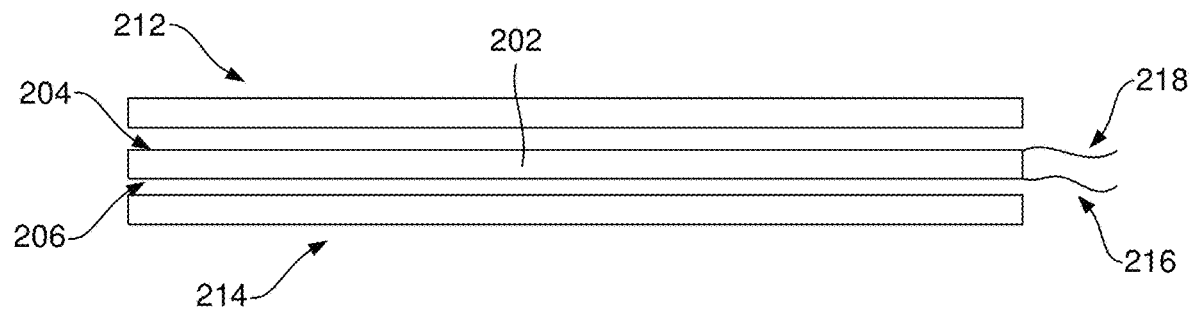
FIG. 3 depicts an example of a touch pad in accordance with the disclosure.

FIG. 3 depicts an example of a substrate 202 with a first set 204 of electrodes and a second set 206 of electrodes deposited on the substrate 202 that is incorporated into a capacitance module. The first set 204 of electrodes and the second set 206 of electrodes may be spaced apart from each other and electrically isolated from each other. In the example depicted in FIG. 3, the first set 204 of electrodes is deposited on a first side of the substrate 202, and the second set 206 of electrodes is deposited on the second side of the substrate 202, where the second side is opposite the first side and spaced apart by the thickness of the substrate 202. The substrate may be made of an electrically insulating material thereby preventing the first and second sets 204, 206 of electrodes from shorting to each other. As depicted in FIG. 2, the first set 204 of electrodes and the second set 206 of electrodes may be oriented transversely to one another. Capacitance measurements may be taken where the intersections with the electrodes from the first set 204 and the second set 206 overlap. In some examples, a voltage may be applied to the transmit electrodes and the voltage of a sense electrode that overlaps with the transmit electrode may be measured. The voltage from the sense electrode may be used to determine the capacitance at the intersection where the sense electrode overlaps with the transmit electrode.

In the example of FIG. 3 depicting a cross section of a capacitance module, the substrate 202 may be located between a capacitance reference surface 212 and a shield 214. The capacitance reference surface 212 may be a covering that is placed over the first side of the substrate 202 and that is at least partially transparent to electric fields. As a user's finger or stylus approach the capacitance reference surface 212, the presence of the finger or the stylus may affect the electric fields on the substrate 202. With the presence of the finger or the stylus, the voltage measured from the sense electrode may be different than when the finger or the stylus are not present. As a result, the change in capacitance may be measured.

The shield 214 may be an electrically conductive layer that shields electric noise from the internal components of the electronic device. This shield may prevent influence on the electric fields on the substrate 202. In some cases, the shield is solid piece of material that is electrically conductive. In other cases, the shield has a substrate and an electrically conductive material disposed on at least one substrate. In yet other examples, the shield is layer in the touch pad that performs a function and also shields the electrodes from electrically interfering noise. For example, in some examples, a pixel layer in display applications may form images that are visible through the capacitance reference surface, but also shields the electrodes from the electrical noise.

The voltage applied to the transmit electrodes may be carried through an electrical connection 216 from the touch controller 208 to the appropriate set of electrodes. The voltage applied to the sense electrode through the electric fields generated from the transmit electrode may be detected through the electrical connection 218 from the sense electrodes to the touch controller 208.

While the example of FIG. 3 has been depicted as having both sets of electrodes deposited on a substrate, one set of electrodes deposited on a first side and a second set of electrodes deposited on a second side; in other examples, each set of electrodes may be deposited on its own dedicated substrate.

Further, while the examples above describe a touch pad with a first set of electrodes and a second set of electrodes; in some examples, the capacitance module has a single set of electrodes. In such an example, the electrodes of the sensor layer may function as both the transmit and the receive electrodes. In some cases, a voltage may be applied to an electrode for a duration of time, which changes the capacitance surrounding the electrode. At the conclusion of the duration of time, the application of the voltage is discontinued. Then a voltage may be measured from the same electrode to determine the capacitance. If there is no object (e.g., finger, stylus, etc.) on or in the proximity of the capacitance reference surface, then the measured voltage off of the electrode after the voltage is discontinued may be at a value that is consistent with a baseline capacitance. However, if an object is touching or in proximity to the capacitance reference surface, then the measured voltage may indicate a change in capacitance from the baseline capacitance.

In some examples, the capacitance module has a first set of electrodes and a second set of electrodes and is communication with a controller that is set up to run both mutual capacitance measurements (e.g., using both the first set and the second set of electrodes to take a capacitance measurement) or self-capacitance measurements (e.g., using just one set of electrodes to take a capacitance measurement).

Figure 4:
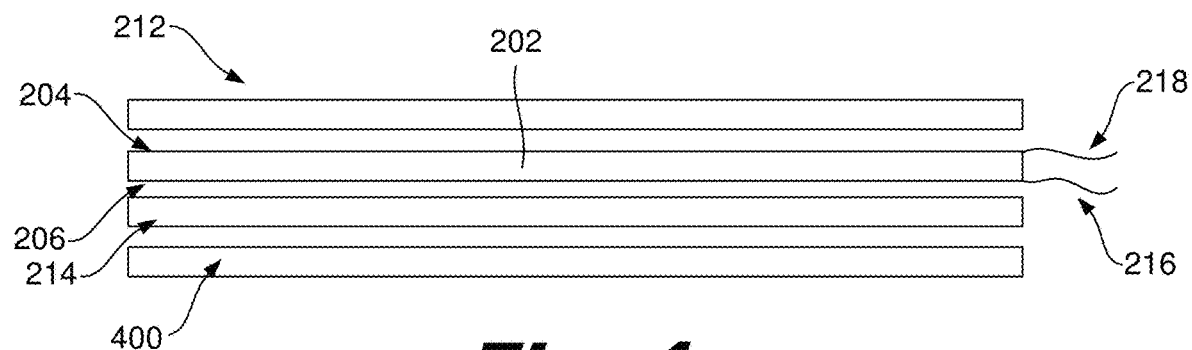
FIG. 4 depicts an example of a touch screen in accordance with the disclosure.

FIG. 4 depicts an example of a capacitance module incorporated into a touch screen. In this example, the substrate 202, sets of electrodes 204, 206, and electrical connections 216, 218 may be similar to the arrangement described in conjunction with FIG. 3. In the example of FIG. 4, the shield 214 is located between the substrate 202 and a display layer 400. The display layer 400 may be a layer of pixels or diodes that illuminate to generate an image. The display layer may be a liquid crystal display, a light emitting diode display, an organic light emitting diode display, an electroluminescent display, a quantum dot light emitting diode display, an incandescent filaments display, a vacuum florescent display, a cathode gas display, another type of display, or combinations thereof. In this example, the shield 214, the substrate 202, and the capacitance reference surface 212 may all be at least partially optically transparent to allow the image depicted in the display layer to be visible to the user through the capacitance reference surface 212. Such a touch screen may be included in a monitor, a display assembly, a laptop, a mobile phone, a mobile device, an electronic tablet, a dashboard, a display panel, an infotainment device, another type of electronic device, or combinations thereof.

Figure 5:
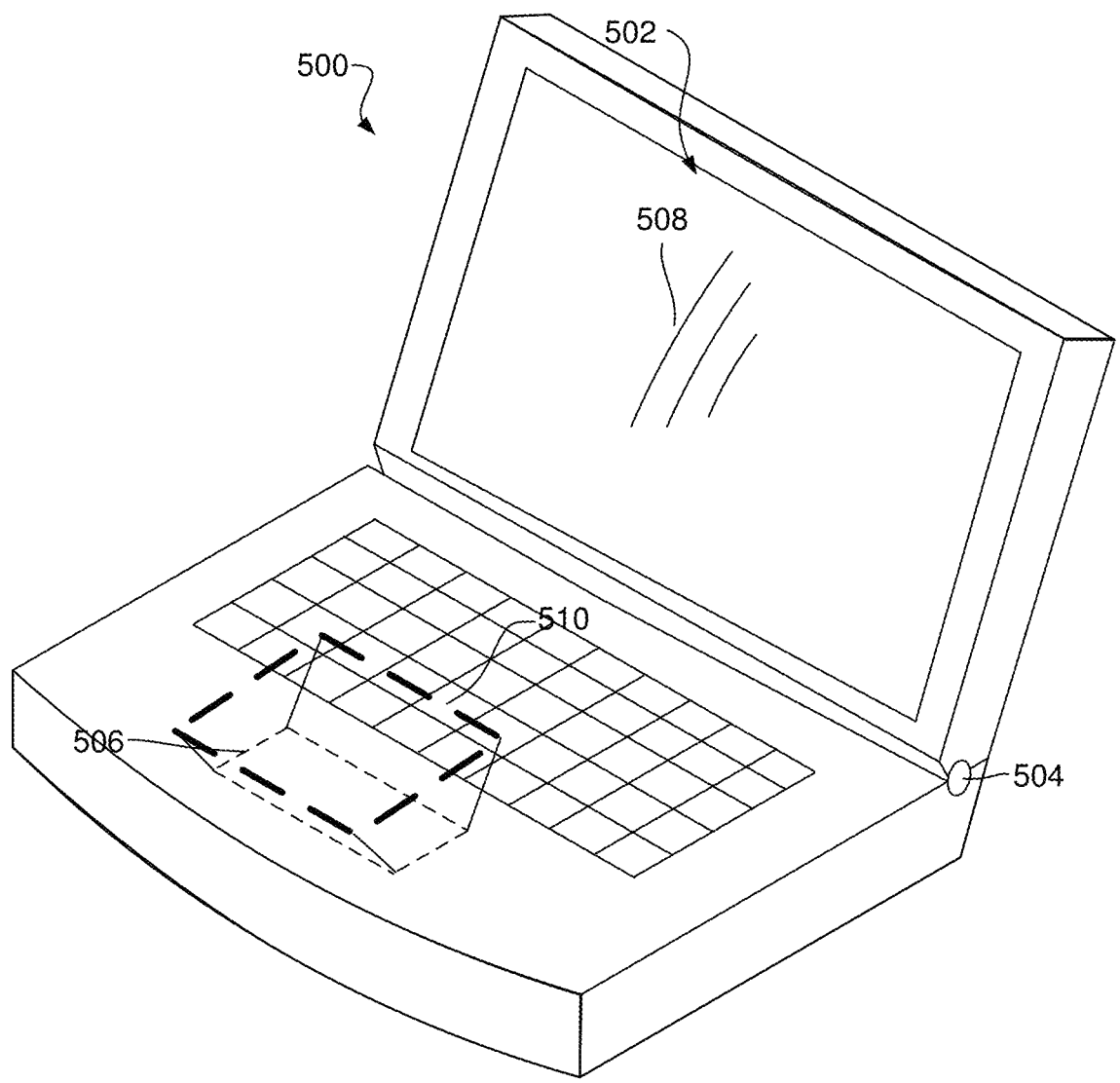
FIG. 5 depicts an example of an electronic device in accordance with the disclosure.

FIG. 5 depicts an example of an electronic device 500. In this example, the device is a laptop computer. A hinge 504 may allow the screen 502 to move in relation to a capacitance module 506. In this example, an electrical signal 508 is broadcasted out from the display 502. A sense range 510 of the capacitance module is adjacent to the capacitance module 506. In some examples, the display 502 may move towards the capacitance module 506 by rotating about the hinge. As the display moves closer to the capacitance module, the signal emitted from the display may start to be detectable within the sense range 510. In such an example, the sense range 510 may detect the electrical signal 508 before the display is within the sense range. In some examples, the controller in communication with the sensor of the capacitance module may determine that the display is in a closed position when the capacitance module can detect the signal being broadcasted from the display component. In other examples, the controller in communication with the sensor of the capacitance module may determine a more precise location of the display based on characteristics of the broadcasted signal. For example, the signal strength may be used to determine a more precise location of the display. In some examples where a determination can be made about a more precise location of the display, the controller may determine that the lid of the electronic component is closed based on the determined location of the display. In other examples, other characteristics of the broadcasted signal may be used to determine a more precise position of the display.

In such an example, sensing that the laptop is closed may trigger an executable action. For example, in response to determining that the laptop is closed, the laptop may switch power modes or turn off. In other examples, the laptop may communicate a message to the user. For example, the message may be an audible message indicating that the laptop will power down in a define period of time. In other examples, the message may include a text message, an email, or another type of electronic message indicating that the device is being powered down.

In some examples, the sense range 510 may be the sense range in which a capacitance electrode or a group of capacitance electrodes within the capacitance module 506 may sense the display's broadcasted signal 508. While the illustrated example depicts the sense area the range being within a small range directly above the capacitance module 506, in other examples, the sense range may be large enough to sense the display within a larger range of positions. In some examples, the sense range may detect the broadcasted signals from the display when the display is substantial aligned with the capacitance reference surface. In other examples, the sense range may detect the broadcasted signal when the display forms between a one-degree angle and a 90-degree angle with the capacitance reference surface.

Figure 6:
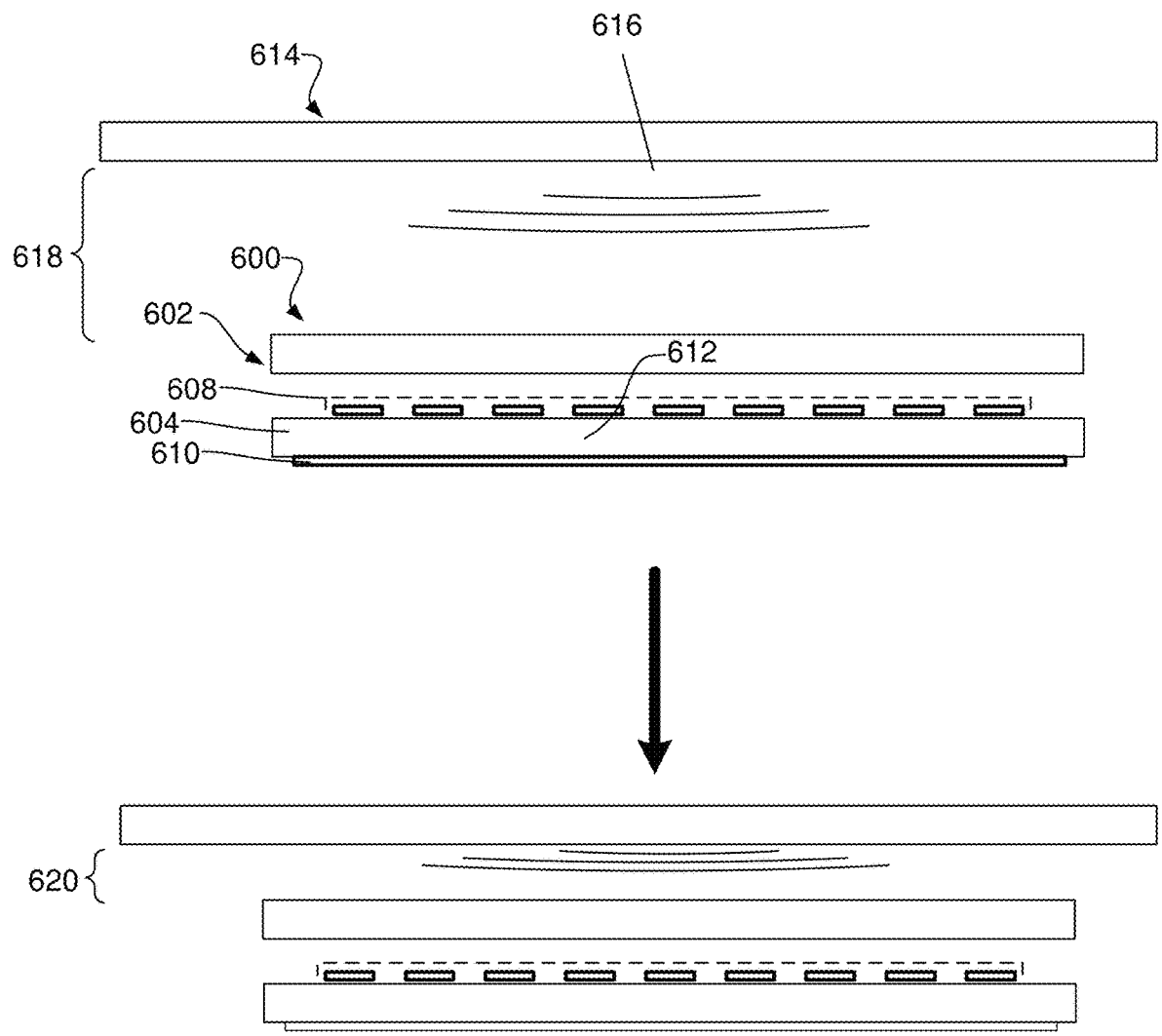
FIG. 6 depicts an example of a display component and a capacitance module in accordance with the disclosure.

FIG. 6 depicts an example of a capacitance module 600. A display component 614 is movable in relation to the capacitance module. A substrate 604 of the capacitance module is positioned adjacent to a capacitance reference surface 602 where the capacitance reference surface 602 is between the substrate 604 and the display component 614. In this example, the substrate 604 has a first side with a set of capacitance sense electrodes 608 and a second side with a set of capacitance transmit electrodes 610. The display component 614 may broadcast an electrical signal 616, such as electrical noise or another type of signal. In this example, the display component and the capacitance module 600 are initially separated by a first distance 618 where the signal from the display component is not detectable within the sensing range. Then, the display component is moved to a second distance from the capacitance module 600 such that the broadcasted signal is detectable within the sensing range of the capacitance module.

In some examples, the broadcasted signal 616 may be detected with the set of sense electrodes 608 of the capacitance module. In such an example, the sense electrodes 608 may measure an electrical property of the broadcasted signal 616, such as amplitude, frequency, pattern, harmonic content, any other property of a signal, or a combination thereof. In some examples, these electrical properties may be used to determine the location of the display component. In some examples, these electrical properties may be used to determine that display component 614 is a predetermined display component.

For example, the display component 614 and the capacitance module 600 may both be components of a laptop computer. As the laptop is closed, the distance between the display component and the capacitance module may change from the first distance 618 to the second distance 620. The set of sense electrodes 608 may detect a signal with a specific amplitude, frequency, and harmonic content. A controller in communication with the sense electrodes may determine that the frequency and harmonic content of the received signal is from the known display component 614. As the amplitude of the signal increases, it may be determined that the lid of the laptop in which the display component is housed is getting nearer to the capacitance module 600. In this way, it may be determined that the laptop is closing. A controller in communication with components of the laptop may then execute programs, actions and/or responses in response to determining that the laptop is closed.

In the example depicted in FIG. 6, the sets of electrodes 608 and 610 may be part of a mutual capacitance circuit that detects and/or measures changes in capacitance. In other examples, the capacitance module 600 may have a self-capacitance circuit. In some examples, the set of transmit electrodes 610 may be driven while the set of sense electrodes 608 is sensing the broadcasted signal 616. In some examples, the transmit electrodes 610 may be deactivated once the broadcasted signal 616 is detected at a certain amplitude. In some examples, the set of transmit electrodes may be driven at certain intervals and/or in a certain pattern and the sense electrodes 608 may detect the properties of the broadcasted signal 616 when the transmit electrodes are not being driven.

In some examples, the broadcasted signal 616 may be a noise signal of the display component 614. In some examples, the set of sense electrodes 608 may detect certain properties of the noise signal. In some examples, the broadcasted signal may be analyzed to determine a base frequency of the signal, harmonics of the signal, and/or the amplitudes of the base and harmonic frequencies. In some examples, the signal may be analyzed for base frequency and odd harmonics. In such an example, a signal may be determined to be from a specific source based on the measured amplitudes and/or frequencies of its base and/or odd harmonic frequencies. In some examples, the set of sense electrodes 608 may be tuned to be sensitive to certain frequencies. In such an example, a shared frequency of a harmonic of the tuned frequency and the signal frequency may be used to determine that the signal may be the signal from the display component 614. In some examples, these frequencies may be between 100 kilohertz to 50 megahertz and another appropriate range.

In some examples, the measured amplitude of the broadcasted signal 616 may determine, at least in part, the position of the display component 614 in relation to the set of sense electrodes 608. In some examples, the determined position of the display component may be greater or lesser than a predetermined sense range. In some examples, a sense range may be used to determine the position of the display component 614. For example, if the distance between the set of capacitance sense electrodes 608 and the display component 614 is determined to be within the sense range, it may be determined that the display component and/or the capacitance module 600 may not be in use. In such an example, a controller in communication with the capacitance module and/or the display component may cause components to be shut off or put into a low power mode. In some examples, the proximity threshold may be based on the calculated position of the display component 614 in relation to the sense electrodes 608. In other examples, the proximity threshold may be based on the amplitude of the broadcasted signal 616.

In some examples, the amplitude of the broadcasted signal 616 may change based, at least in part, on user defined settings. For example, if a user changes the brightness or color on the display component 614, the amplitude of the signal may become greater or lesser than the default amplitude. In such an example, a controller in communication with the display component and/or the capacitance module 600 may adjust the calculation for the position of the display component in relation to the capacitance module.

In some examples, the set of sense electrodes 608 may be tuned to detect a certain characteristic of the broadcasted signal 616. In some examples, the broadcasted signal 616 may have a harmonic pattern determined with a consistent characteristic of the display component 614. For example, the rate of pixels being changed on a laptop screen may determine a fixed harmonic pattern in the output noise signal. In such an example, the set of sense electrodes 608 may be tuned to detect the fixed harmonic pattern. In other examples, the broadcasted signal 616 may change based on the brightness, color, and/or shape of the image being displayed in the display component 614. In such an example, the set of sense electrodes 608 may be tuned to detect multiple characteristics of the signal 616. In some examples, a controller in communication with the display component 614 and/or the capacitance module 600 may tune the sense electrodes 608 to detect a specific characteristic of the signal based, at least in part, on the output in the display component 614.

In some examples, a controller in communication with the capacitance module 600 and/or the display component 614 may be calibrated or recalibrated to recognize the broadcasted signal 616. In some examples, the display component 614 may display a static image while it is adjacent to the capacitance module 600. In such an example, the set of transmit electrodes 610 may be deactivated and the set of sense electrodes 608 may measure the broadcasted signal 616. Memory in communication with the controller may save the measurement from the sense electrodes and after this calibration, detecting a similar measurement on the set of sense electrodes 608 may indicate a detection of the broadcasted signal 616. In some examples, calibration may be initiated by a user.

In some examples, a controller in communication with the display component 614 and/or the capacitance module 600 may apply an image on the display component 614. In some examples, the capacitance module 600 may detect a signal and is unable to determine whether the signal is the broadcasted signal 616. In such an example, a controller in communication with the capacitance module and/or the display component 614 may apply an image to the display component 616 that broadcasts a known signal. For example, if the display component 614 is adjacent to the capacitance module 600 but the capacitance module 600 does not determine that the display component 614 is adjacent, but does detect a signal, a controller in communication with the capacitance module 600 and/or display component 614 may cause the display component 614 to display a black screen. The capacitance module 600 may then recognize that the signal it is detecting may be the broadcasted signal 616 of the display component 614.

In some examples, the broadcasted signal is programmed to be emitted from the display component. A signature or signatures of the broadcasted signal may be stored in memory accessible to the controller in communication with the capacitance module. In response to detecting a broadcasted signal, the controller may compare the received broadcasted signal to the store signal or a characteristic of the stored signal. If the received broadcasted signal is similar enough to the store signal, the controller may determine that the lid containing the display component is closed or within a range where the user is not likely using the laptop.

In some examples, the broadcasted signal is a continuous signal emitted from the display component. In other examples, the broadcasted signal is emitted on a periodic basis. For example, the broadcasted signal may be transmitted from the display component at a regular interval. In some cases, the interval between the transmissions of the broadcasted signal may be used to confirm that what type of signal is being received with the capacitance module.

In some cases, multiple predetermined signals are broadcasted from the display. In some examples, the controller has to determine the receipt of more than one broadcasted signal to determine the location of the display component. In this particular example, receiving multiple broadcasted signals may reduce false positives. In another example, a first broadcasted signal may be used to determine a location of the display component, and a second broadcasted signal may be used to communicate another condition or instruction to the controller. For example, the second broadcasted signal may be used to determine that the display was already in a reduced power mode when the display component was moved into the closed position. In yet another example, the second broadcasted signal may be used to determine that the display component was displaying a movie when the lid of the laptop or other electronic device was closed. In such an example, the controller may send a signal to cause the movie to be paused, or to put the time position of the movie into memory before shutting down a computer so the user's place in the movie can be saved when the user opens the lid to the laptop or other device.

In some cases, the system can determine multiple positions of the display component of the electronic device. For example, the system may be configured to determine when the electronic device is partially closed. In this example, the system may send a message to perform one or more partial-closure actions. The system may also be configured to determine when the electronic device is fully closed. In a situation where the system determines that the electronic device is fully closed, the system may send instructions to perform a fully-closed action that is different than the one or more partially-closed actions. By way of example only, the partially-closed actions may include pausing a movie, lower the power mode of the electronic device, turning off a screen, turning off a camera, muting a microphone, turning off speakers, closing an application, authenticating a user action, performing another action, or combinations thereof. Also by way of example only, the fully-closed actions may shutting down the electronic device or another type of action.

Figure 7:
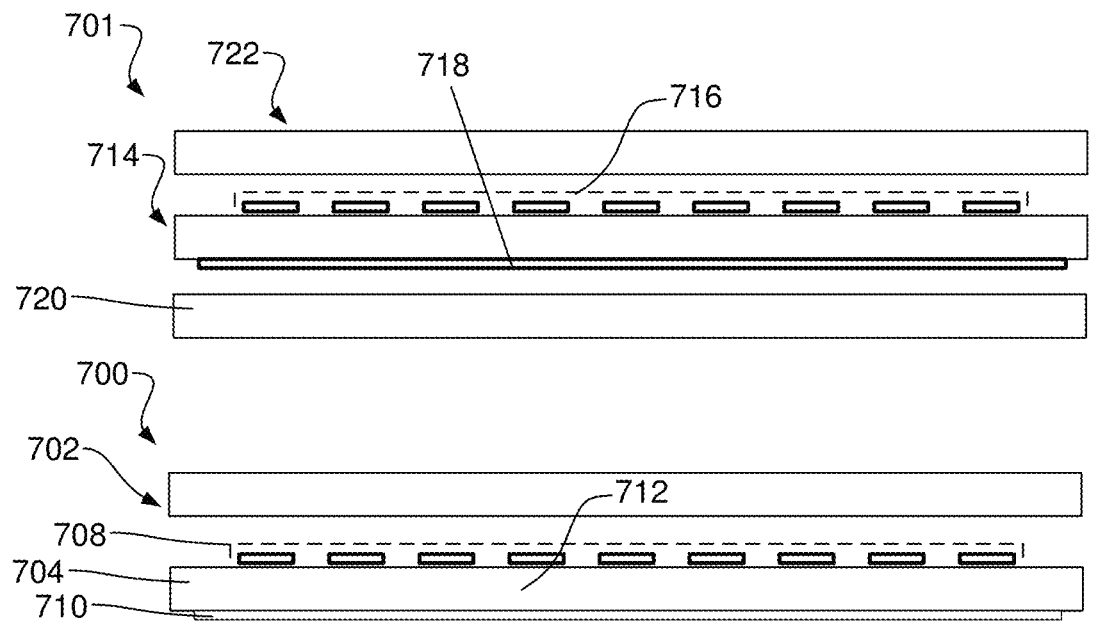
FIG. 7 depicts an example of a touch display component and a capacitance module in accordance with the disclosure.

FIG. 7 depicts an example of a capacitance module 700 incorporated into a first part of an electronic device and a touch display component 701 incorporated into a second part of an electronic device positioned adjacent to the capacitance module 700. In this example, the electrodes of the touch module can be used to broadcast the signal from the display component to the capacitance module in the first part of the electronic device. In some cases, the first part of the electronic device includes the capacitance module and a separate keyboard module. The first and second parts of the electronic device may be pivotally attached to each other.

In the first part of the electronic device, a capacitance substrate 704 is positioned adjacent to a capacitance reference surface 702. A first side of the capacitance substrate has a set of capacitance sense electrodes 708 and a second side of the capacitance substrate has a set of capacitance transmit electrodes 710. In other examples, the capacitance module includes a signal set of electrodes configured to transmit and receive capacitance si In a second part of the electronic device, a display substrate 714 is positioned between a touch reference surface 720 and a display layer 722. The display layer may include one or more pixels configured to present an image in the display. The touch substrate has a first side with a set of touch sense electrodes 716 and a second side with a set of touch transmit electrodes 718. In some examples, the sets of capacitance electrodes 708 and 710 in the first part of the electronic device are included in a first capacitance circuit that detects and/or measures changes in capacitance in the first part of the electronic device and the sets of touch electrodes 716 and 718 are part of a second touch sensing circuit that detects and/or measures changes in capacitance in a second part of the electronic device. For example, the touch circuit may be incorporated into a touch screen of a laptop and the capacitance module may be incorporated into a touchpad of the laptop. In yet another example, the touch circuit may be incorporated into a first part of a bendable smart phone and the capacitance circuit may be incorporated into a second part of the bendable smart phone. In some cases, the touch circuit and the capacitance circuit operate the same or in a similar manner and/or have the same or a similar structure. Although in other examples, the touch circuit and the capacitance circuit may operate differently and/or have a different structure.

In some examples, the set of capacitance sense electrodes 708 and the set of display transmit electrodes 718 may interact with each other. In some examples, the display transmit electrodes may be driven with a certain signal that may be detected with the capacitance sense electrodes. In some examples, the set of capacitance sense electrodes 708 may detect a property of the signal driving the set of display transmit electrodes 718. In some examples, the set of capacitance sense electrodes 708 may detect the frequency, amplitude, harmonic content, another electrical property of the signal driving the set of display transmit electrodes 718, or a combination thereof.

In some examples, the set of capacitance module 700 may determine the relative position of the display component 701 by detecting with the set of capacitance sense electrodes 708 the amplitude of the signal driving the set of display transmit electrodes 718. For example, the display transmit electrodes may be driven with a signal with a certain frequency and amplitude. This may cause an electric field to be produced with the display transmit electrodes 718. If the set of display transmit electrodes 718 are adjacent to the set of capacitance sense electrodes 708, the set of capacitance sense electrodes may detect the electric field being produced with the display transmit electrodes 718. A controller in communication with the capacitance module 700 may determine that the electric field may be from the display transmit electrodes by analyzing a property of the electric field based, at least in part, with the measurements of the set of capacitance sense electrodes 708. The controller may also determine the position of the set of display transmit electrodes 718 based, at least in part, on the measurements of the set of capacitance sense electrodes 708.

In some examples, the capacitance sense electrodes 708 may detect properties of a signal driving the set of display transmit electrodes 718 and it may be determined that the origin of the signal is a specific device. For example, a laptop may have a touchscreen on a top portion and a touchpad on a bottom portion. In such an example, the touch display device 701 may be a touchscreen and the capacitance module 700 may be a touchpad. As the top portion of the laptop moves nearer to the bottom portion of the laptop, the set of capacitance sense electrodes 708 may detect the signal driving the set of display transmit electrodes 718. A controller in communication with the touch display component 701 and/or the capacitance module may determine that the signal being detected with the capacitance sense electrode is being output with the touch display component.

In some examples, the touch display component 701 may be a laptop screen. In other examples, the touch display component may be a smartphone screen, a smartwatch screen, or any other electronic touch display device. In some examples, the set of capacitance sense electrodes 708 may detect a signal and it may be determined that the origin of the signal is a specific device from one of several known devices.

In some examples, the detection with the set of capacitance sense electrodes 708 of a signal produced with the touch display component may trigger a device in communication with the capacitance module 700 and/or the touch display component 701 to enter a low power mode, authenticate a log in, authenticate two-factor authentication, open a computer program, perform an action within a computer program or any other appropriate response in a device in communication with the capacitance module 700 and/or the touch display component 701.

Figure 8:
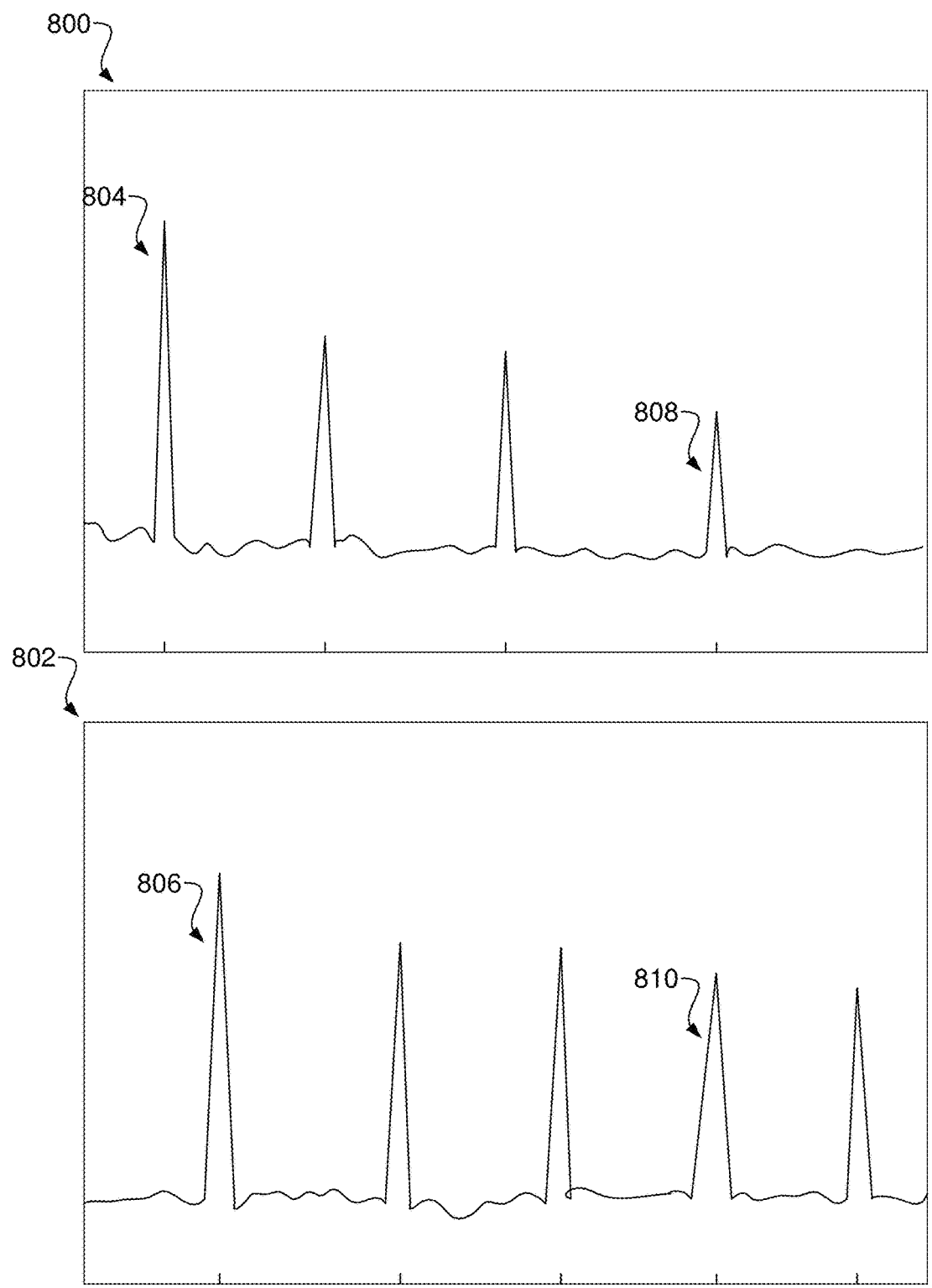
FIG. 8 depicts an example of a first and second signal frequency graph in accordance with the disclosure.

FIG. 8 depicts an example of a display signal frequency plot 800 and a touchpad signal frequency plot 802. These plots may represent the frequency content of the noise signals produced with a display and a touchpad respectively. The x-axis of the plots represent frequency, and the y-axis represents amplitude in both plots 800, 802. A display base peak 804 on the display frequency plot 800 may represent the amplitude of a base frequency of the display noise signal. A display harmonic peak 808 may represent the amplitude of a harmonic of the display noise signal. A touchpad base peak 806 on the touchpad signal frequency plot 802 may represent the amplitude of a base frequency of the touchpad noise signal. A touchpad harmonic peak 810 may represent the amplitude of a harmonic of the touchpad noise signal. The touchpad base peak 806 may have a first frequency and the display base peak 804 may have a second frequency. The harmonic peaks 808 and 810 may have a third frequency.

For example, the display base frequency may be 180 kilohertz and the touchpad base frequency may be 315 kilohertz. In such an example, the broadcasted display signal may have odd harmonics that are high in amplitude. The odd harmonics of the display signal may be at 540 kilohertz, 900 kilohertz, 1.26 megahertz, etc., and the harmonics of the touchpad signal may be at 630 kilohertz, 945 kilohertz, 1.26 megahertz, 1.58 megahertz, etc. The harmonic at 1.26 megahertz may be a part of both signals and may be represented by the harmonic peaks 808 and 810. In some examples, this harmonic may be broadcasted by a display component and detected with a touchpad.

In some examples, the touchpad noise signal represented by the touchpad signal frequency plot 802 may be the noise broadcasted by the alternating current (AC) signal applied to a set of transmit electrodes in a touch capacitance module. A set of sense electrodes in the touch capacitance module may be tuned to receive the applied signal at the frequency of the applied signal. In such an example, the set of sense electrodes may be tuned to receive the frequencies shown at the touchpad base peak 806 and the touchpad harmonic peak 810. In some examples, the display noise signal represented by the display signal frequency plot may be a noise signal produced with a display component. In some examples, the noise may be determined with the display refreshing and/or changing pixels in the display component. In some examples, the noise broadcast with the display may be determined, at least in part, with the frequency of an alternating current (AC) signal applied to components of the display. In some examples, the display system may broadcast a noise signal at the frequencies shown at the display base peak 804 and the display harmonic peak 808.

In some examples, the shared frequency of the display harmonic peak 808 and the touchpad harmonic peak 810 may represent a frequency at which a display component is broadcasting and which a set of sense electrodes in a touch capacitance module is programmed to receive. In some examples, the set of sense electrodes in the touch capacitance module may detect the location and/or proximity of the display component by detecting the frequency and/or amplitude of a harmonic of a signal represented by the display harmonic peak 808.

In some examples, the display signal represented by the display signal frequency plot 800 may have odd harmonics with a high amplitude. In some examples, the display signal may have even harmonics with high amplitudes. In some examples, the display signal may have some harmonics, all harmonics, a set of harmonics, or a combination thereof with high amplitudes. In some examples, the touchpad signal represented by the touchpad signal frequency plot 802 may have odd harmonics with high amplitudes. In some examples, the touchpad signal may have even harmonics with high amplitudes. In some examples, the touchpad signal may have some harmonics, all harmonics, a set of harmonics, or a combination thereof with high amplitudes.

Figure 9:
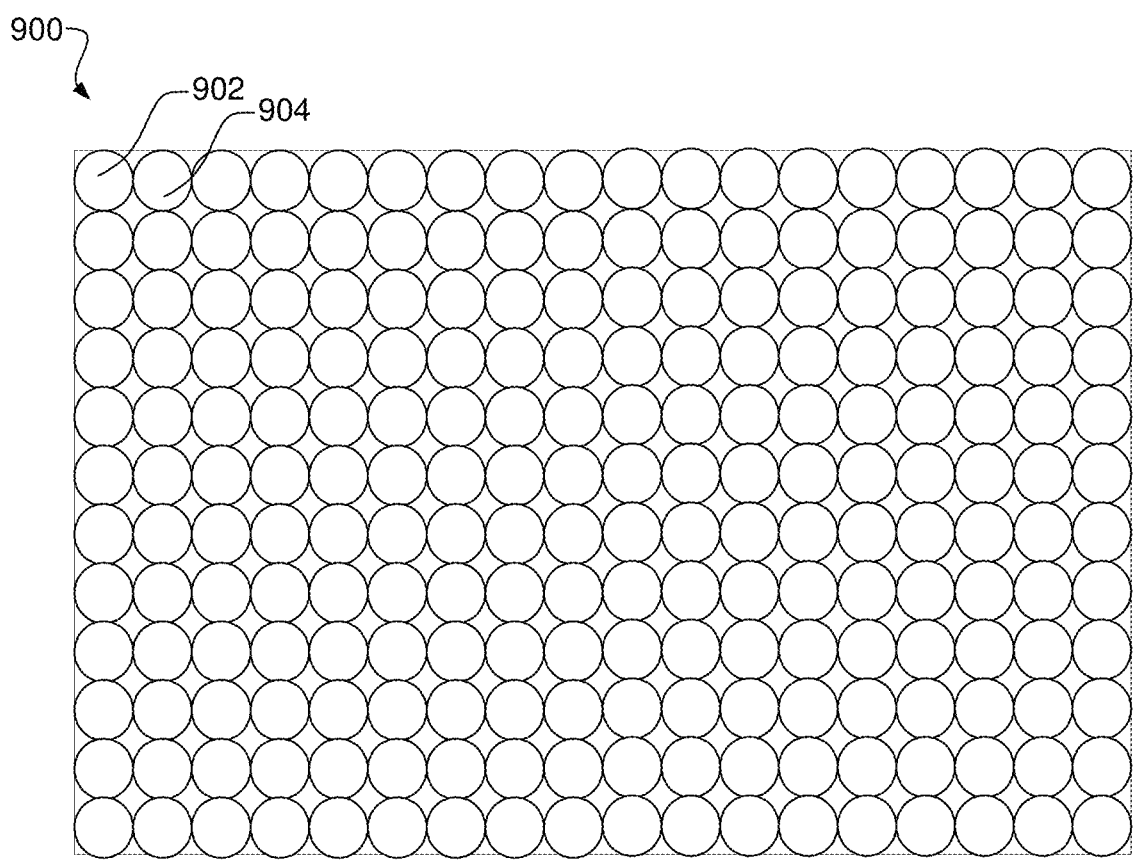
FIG. 9 depicts an example of a display component in accordance with the disclosure.

FIG. 9 depicts an example of a display system 900. A first light emitting component 902 is positioned next to a second light emitting component 904. In some examples, the two light emitting components are a part of a plurality of light emitting components. In some examples, the plurality of light emitting components emit light with a certain color and/or brightness. In some examples, the light emitting components are part of a display circuit. In some examples, the color and/or brightness of the plurality of light emitting components may be set with a controller in communication with the display circuit. The controller may set the color and/or brightness of the plurality of light emitting components one after another. In some examples, the light emitting component 902 may be set to a certain color and/or brightness first and then the light emitting component 904 may be set to a certain color and or brightness, and then the remainder of the plurality of the light emitting components may be set in a similar manner. The display system 900 may display a picture using the light emitting components.

In some examples, the display system 900 may set the plurality of light emitting components in a continuous manner. In some examples, after the display system has set the last of the plurality of light emitting components, the display system may again set the first of the plurality of light emitting components and set all of the light emitting components again. In some examples, the display system may continue to do so while in operation. In some examples, the display system 900 may change the color and/or brightness of some of the plurality of light emitting components and set some to not change as it sets the plurality of light emitting components. In some examples, the display system 900 may change the color and/or brightness of the plurality of light emitting components. In some examples, the display system may set the light emitting components to remain emitting the same color and/or brightness as it sets the plurality of light emitting components. The pattern by which the display system sets the plurality of light emitting components may determine, at least in part, the electrical noise produced with the display system. In some examples, the color and/or brightness of each of the plurality of light emitting components may determine, at least in part, the electrical noise produced with the display system. In some examples, a capacitance module adjacent to the display system 900 may detect the electrical noise broadcasted from the display system 900. In some examples, a controller in communication with the display system and/or the capacitance module may determine, at least in part, how the capacitance module detects the noise from the display system 900. In some examples, the controller may determine how the capacitance module detects the noise from the display system 900 based, at least in part, on the pattern of updating the plurality of light emitting components, method of updating the plurality of light emitting components, frequency of updating the plurality of light emitting components, color of the light emitting components, brightness of the light emitting components, or combination thereof.

In some examples, the display system may set the plurality of light emitting components at a certain rate. For example, the display system may set the first light emitting component 902 and then wait a certain amount of time before setting the color and/or brightness of the second light emitting component 904. The rate at which the display system sets the plurality of light emitting components may determine, at least in part, the electrical noise produced with the display system. In some examples, this noise signal has a certain frequency, amplitude, and/or harmonic content based, at least in part, on the rate at which the display system updates the plurality of light emitting components. In some examples, a capacitance module adjacent to the display system may detect the frequency, amplitude, and/or harmonic content of a noise signal broadcasted with the display system 900. In some examples, the capacitance module adjacent to the display may be tuned to detect a noise signal broadcasted from the display system based, at least in part, on the rate at which the display system sets the plurality of light emitting components.

Figure 10:
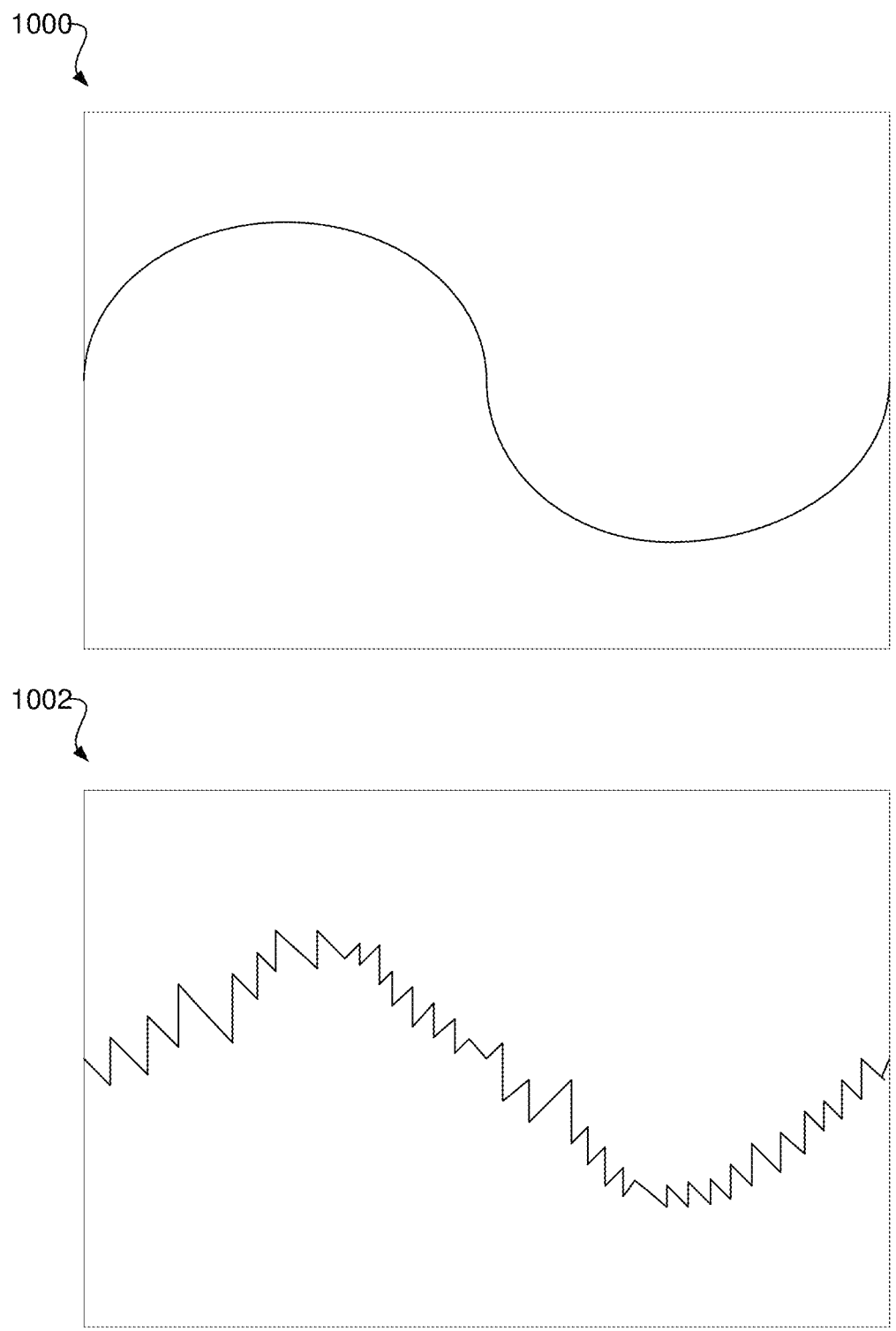
FIG. 10 depicts an example of a first and second signal in accordance with the disclosure.

FIG. 10 depicts an example of a first signal 1000 and a second signal 1002. In some examples, the first signal 1000 may represent a first signal with a certain frequency, amplitude and harmonic content and the second signal 1002 may represent a second signal with a certain frequency, amplitude and harmonic content. In some examples, the signals may share a characteristic, such as a harmonic or a fundamental frequency. In some examples, the two signals 1000, 1002 may be signals broadcasted from a display component. In some examples, the first signal 1000 may be the broadcasted signal from the display component displaying a first image and the second signal 1002 may be the broadcasted signal from the display component displaying a second image. In some examples, the display component may broadcast a signal with different frequency, amplitude, harmonic content or a combination thereof based, at least in part, on the image being displayed with the display component. In some examples, the different signals broadcasted with the display component may share some properties. In some examples, these shared properties may be in any signal broadcasted with the display component. In some examples, these shared properties may be detectable with a capacitance module adjacent to the display component.

Figure 11:
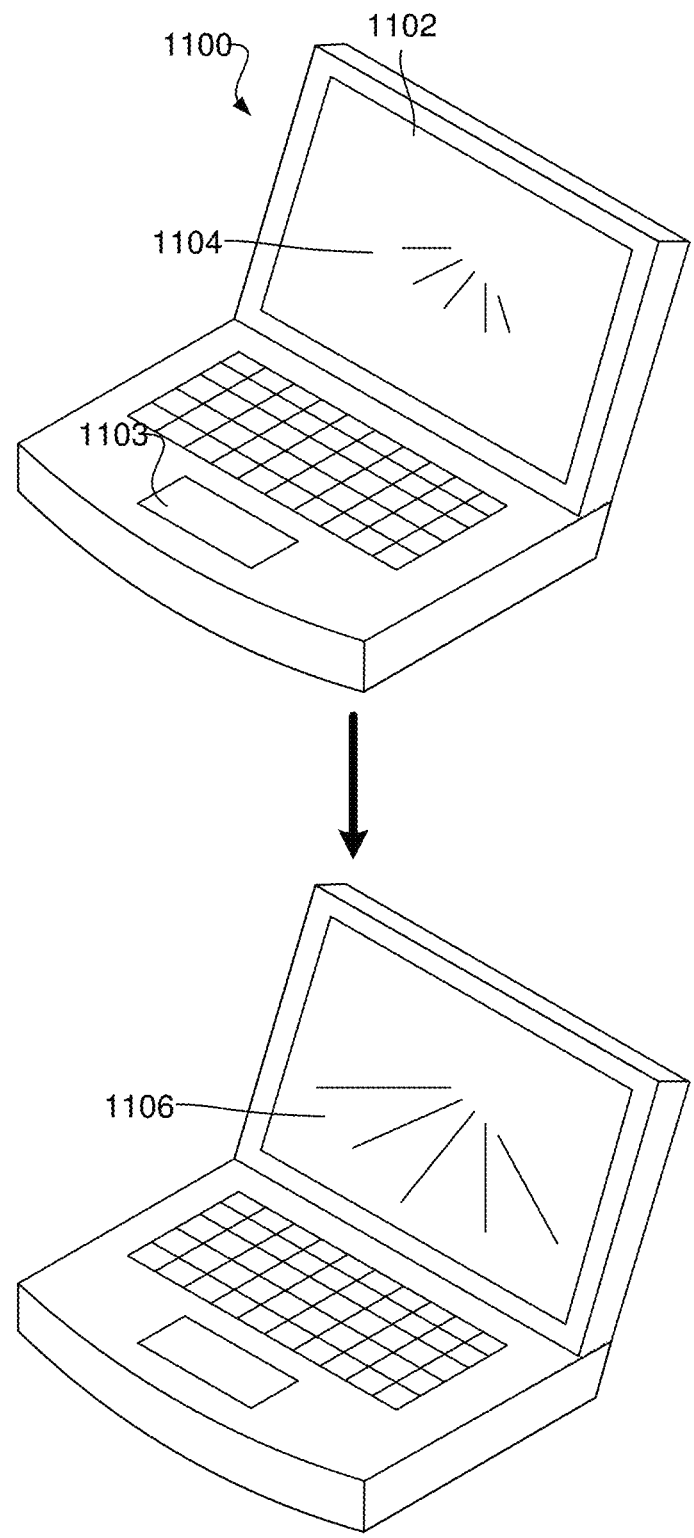
FIG. 11 depicts an example of a screen changing brightness in accordance with the disclosure.

FIG. 11 depicts an example of a laptop computer device 1100 with a display 1102 and a capacitance module 1103, such as a touch pad. The display 1102 may be configured to have multiple brightness. For example, the display may include a first brightness 1104 and a second brightness 1106. The display may emit the first brightness or the second brightness based on user input, instructions from a program, media presented in the display, a device setting, another factor, or combinations thereof.

In some examples, the change in the brightness of the display 1102 may change the amplitude, frequency and/or harmonic content of an electrical signal being broadcast from the screen 1106. In some examples, this signal may be detected with the capacitance module 1103. In some examples, the change in the amplitude, frequency and/or harmonic content of the signal may affect the detection of the signal with the capacitance module 1103. In some examples, a controller in communication with the display and/or the capacitance module may change how the capacitance module detects the signal from the display 1102.

In some examples, a first broadcasted signal associated with the first brightness is different than a second broadcasted signal associated with the second signal. Both the first and second signals may be stored in memory accessible to the controller in communication with the capacitance module. In some cases, when a characteristic of the detected signal matches with the first stored signal or the second signal, the system may determine that the signal is from the display and trigger the appropriate response.

In some examples, when the display changes from the first brightness 1104 to the second brightness 1106 a controller in communication with the display and/or the capacitance module may determine that the amplitude, frequency and/or harmonic content of the signal being broadcast from the display has changed. The controller may change how the capacitance module 1103 detects the new signal.

Figure 12:
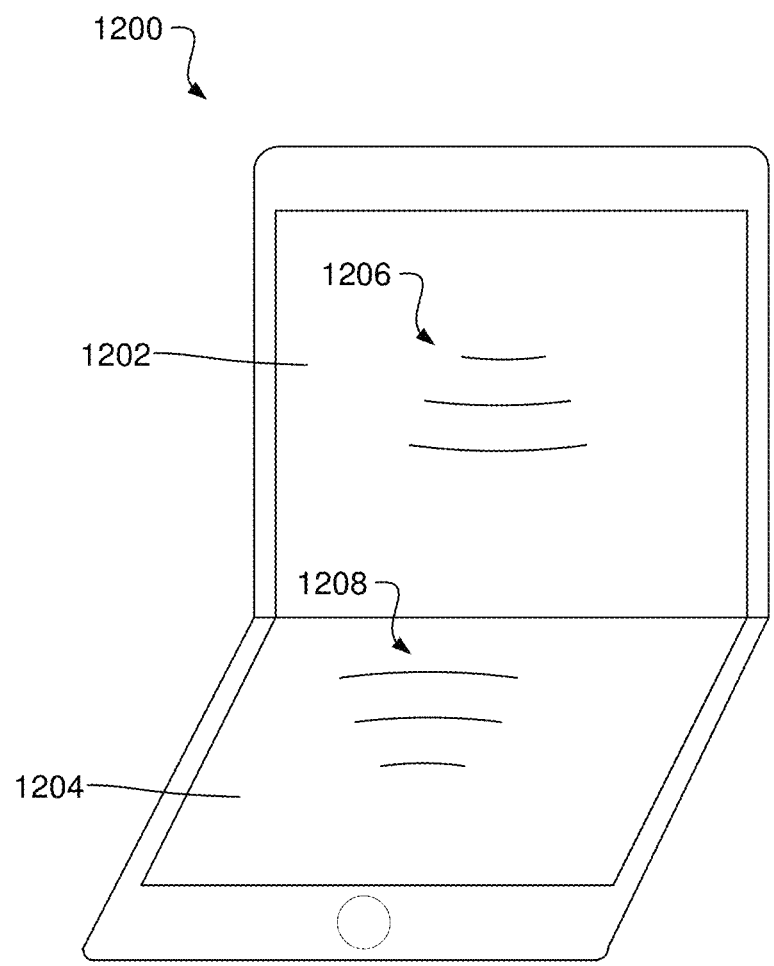
FIG. 12 depicts an example of a smartphone device in accordance with the disclosure.

FIG. 12 depicts an example of a mobile device 1200 such as a smartphone, an electronic tablet, or another type of electronic device. A first portion 1202 is movable in relation to a second portion 1204 so that the first and second portions may fold against each other. In some examples, the two portions may be part of the same continuous display. In other examples, the first portion may include a first display, and the second portion may include a second display.

In some examples, one or both of the first and second portions may broadcast noise signals. In some examples, one or both of the first and second portions may determine the location of the other portion, based at least in part, on the detection of broadcasted signal from the other portion.

Figure 13:
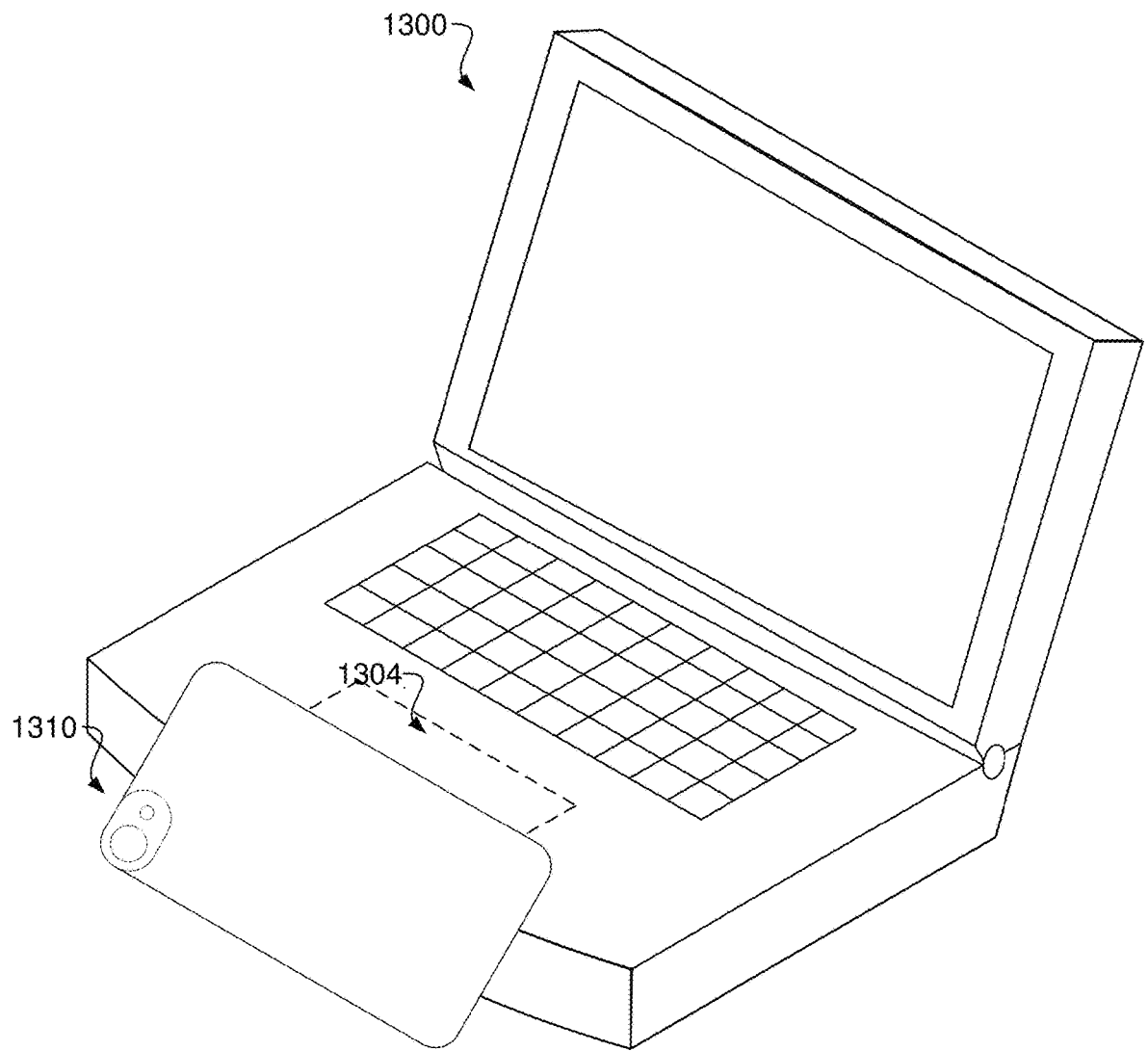
FIG. 13 depicts an example of a laptop computer and a smartphone device in accordance with the disclosure.

FIG. 13 depicts an example of a laptop computer 1300 and a smartphone device 1310. The smartphone device may have a touch display component that is positioned adjacent to a capacitance module 1304 of the laptop computer. In some examples, the touch display component of the smartphone device 1310 may broadcast a noise signal. In some examples, the capacitance module 1304 may determine the position of the smartphone device based, at least in part, by detecting the noise signal from the touch display component of the smartphone device 1310. In some examples, the capacitance module and/or a controller in communication with the capacitance module may determine that the smartphone device is a known, specific device. In some examples, the touch display component of the smartphone device may broadcast a specific signal that may be detected with the capacitance module.

In some examples, detecting a specific signal from the smartphone device may cause the capacitance module and/or a controller in communication with the capacitance module to perform a predetermined action within the laptop computer 1300. For example, the predetermined action may include authenticating a user action, pairing the devices together, sending a message between the device, changing a power setting on either of the devices, opening a program on one of the devices, performing another action, or combinations thereof.

Figure 14:
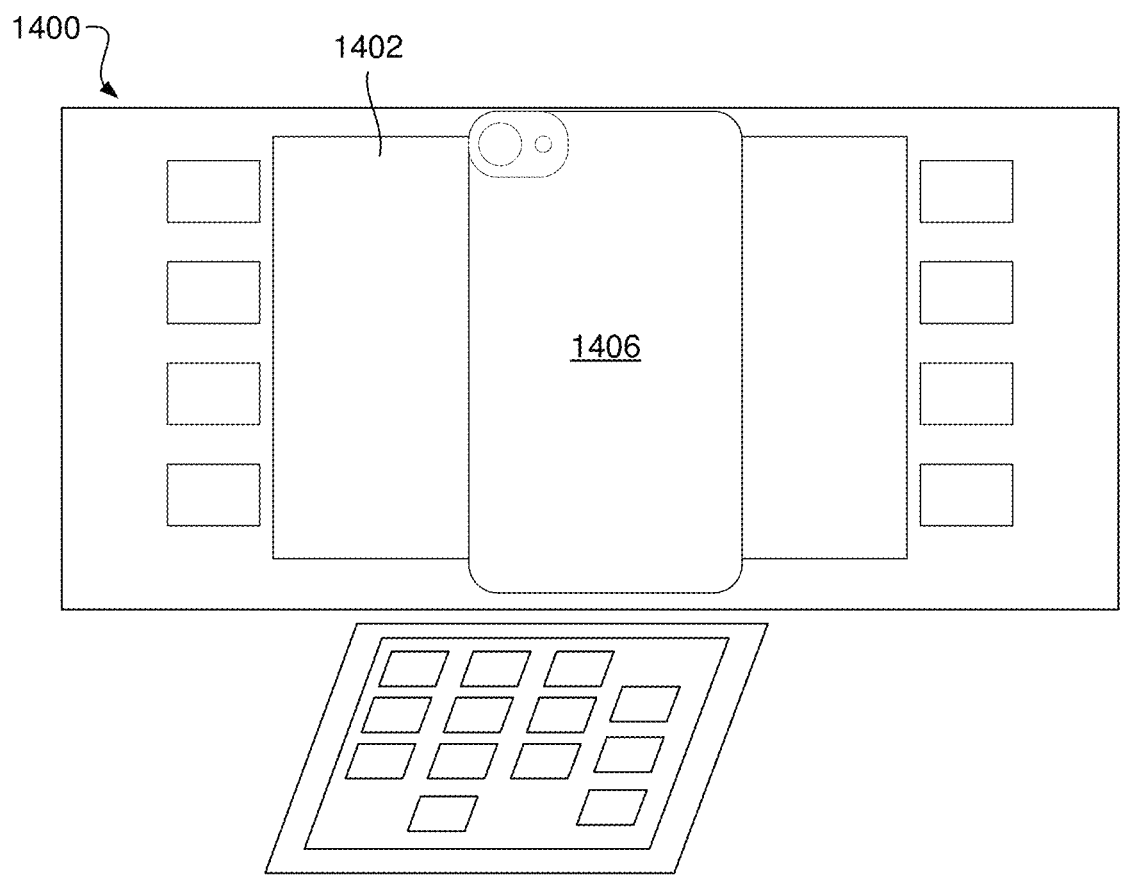
FIG. 14 depicts an example of an automated teller machine and a smartphone device in accordance with the disclosure.

FIG. 14 depicts an example of an automated teller machine (ATM) 1400, a display in a kiosk, or another type of display. In this example, a smartphone device 1406 may be positioned adjacent to the touch display component 1402 of the ATM 1400. In this example, the smartphone device includes a display, which is obscured from view due to the orientation of the smartphone device facing the touch display of the ATM. In some examples, the display component of the smartphone device 1406 may communicate with the touch display component 1402 of the ATM 1406 to authenticate that the smartphone device 1406 as a specific, known device. In some examples, the communication may be part of an authentication process. In some examples, the communication may be part of a two-factor authentication process.

Figure 15:
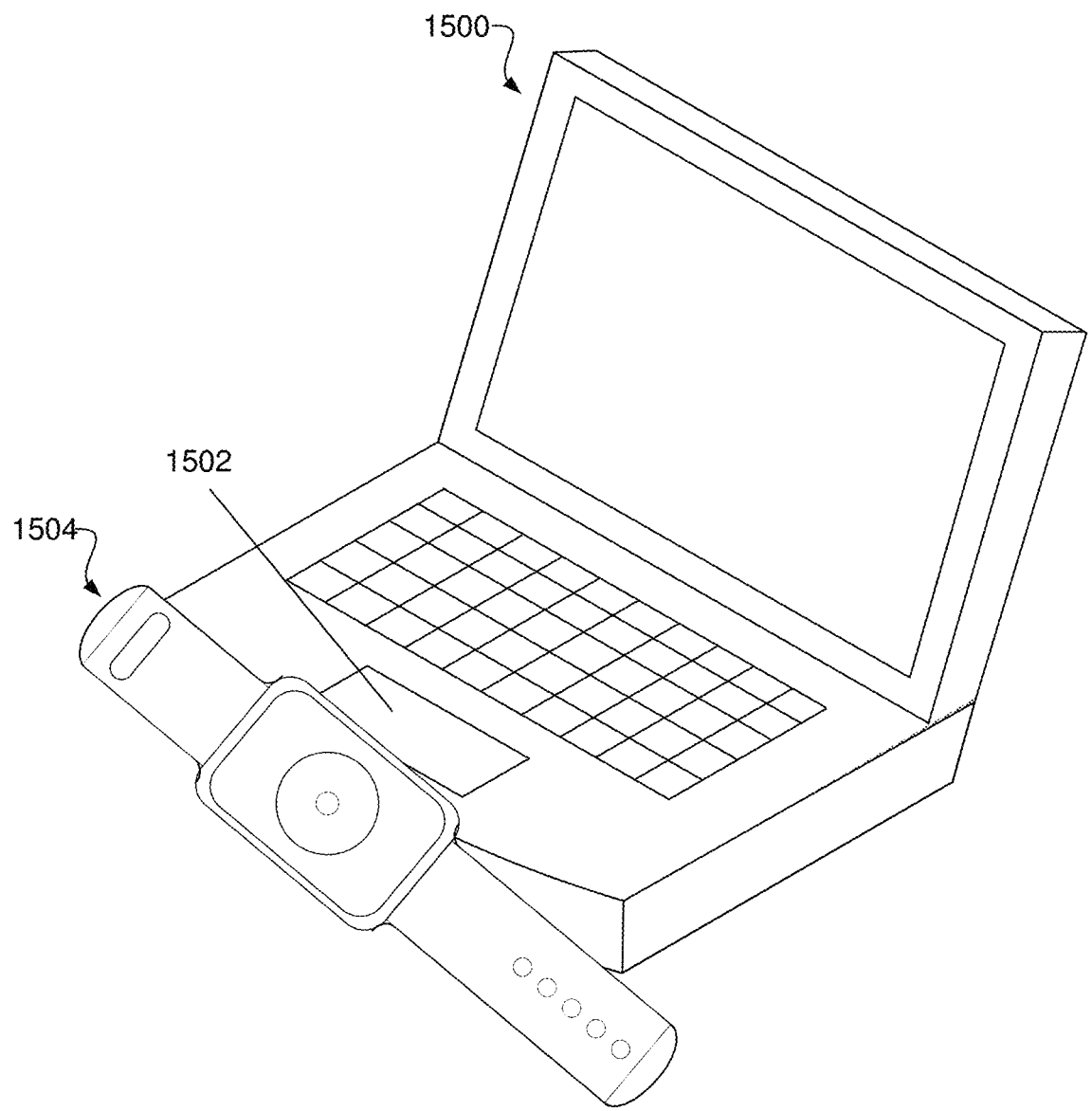
FIG. 15 depicts an example of a laptop computer and a smartwatch device in accordance with the disclosure.

FIG. 15 depicts an example of a laptop computer 1500 and a smartwatch device 1504 or another type of mobile device. In this example, the smartwatch includes a display, which is obscured from view due to the orientation of the smartwatch facing the capacitance module of the laptop. The smartwatch device 1504 may be positioned adjacent to a capacitance module 1502 of the laptop computer 1500 such that a broadcasted signal from the display of the smartwatch is within the sense range of the laptop's capacitance module. In some examples, the touch display component of the smartwatch device may communicate with the capacitance module 1502 and/or a controller in communication with the capacitance module 1502.

Figure 16:
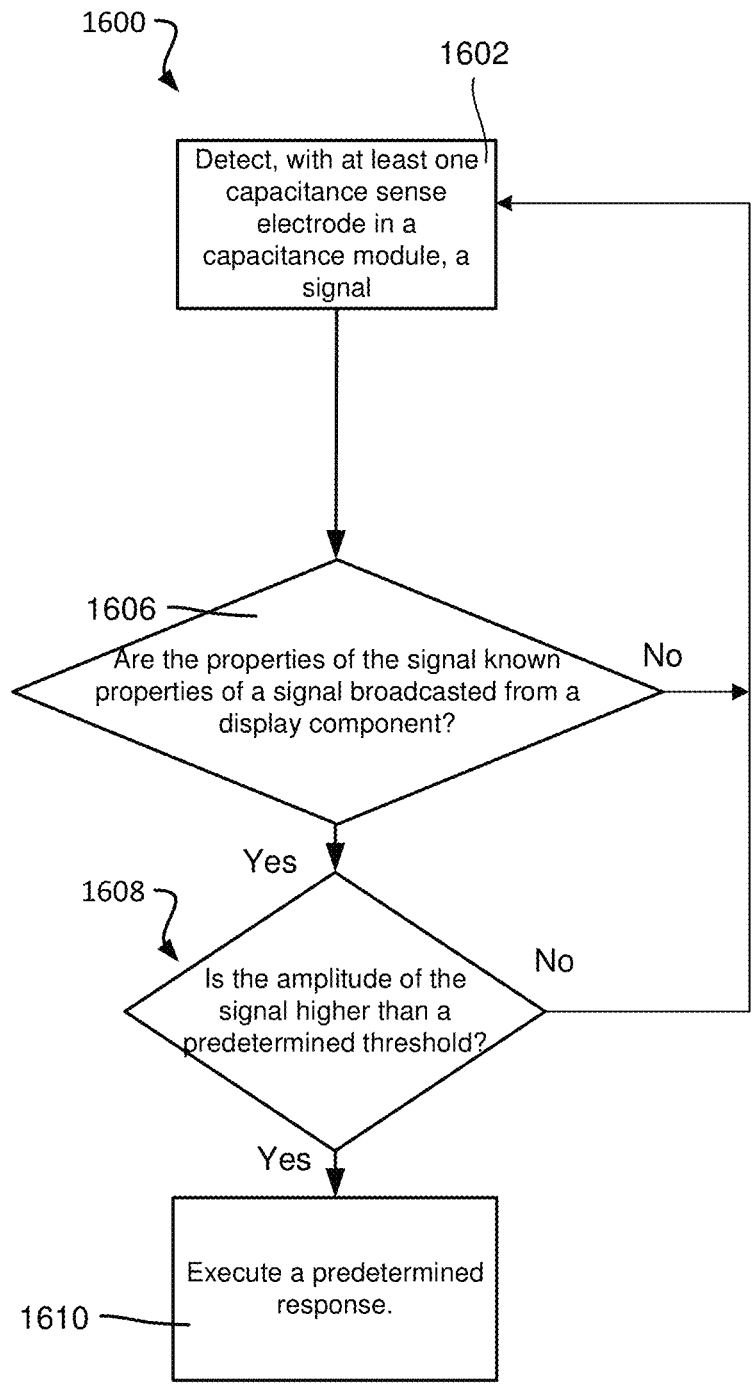
FIG. 16 depicts an example of a method of detecting a broadcasted signal in accordance with the disclosure.

FIG. 16 depicts an example of a method 1600 of detecting a broadcasted signal. This method 1600 may be performed based on the description of the devices, modules, and principles described in relation to FIGS. 1-15. In this example, the method 1600 includes detecting 1602, with at least one capacitance sense electrode in a capacitance module. The method 1600 also includes determining 1606 if the properties of the signal are known properties of a signal broadcasted from a display component. If the properties of the signal are known properties of a broadcasted signal from a display component, the method 1600 includes determining 1608 if the amplitude of the detected broadcasted signal is higher than a predetermined threshold. If the amplitude of the detected broadcasted signal is higher than the predetermined threshold, the method 1600 includes executing 1608 a predetermined response. If the amplitude of the detected broadcasted signal is higher than the predetermined threshold, the method 1600 includes continuing 1612 to detect the signal, with at least one capacitance sense electrode in a capacitance module.

Figure 17:
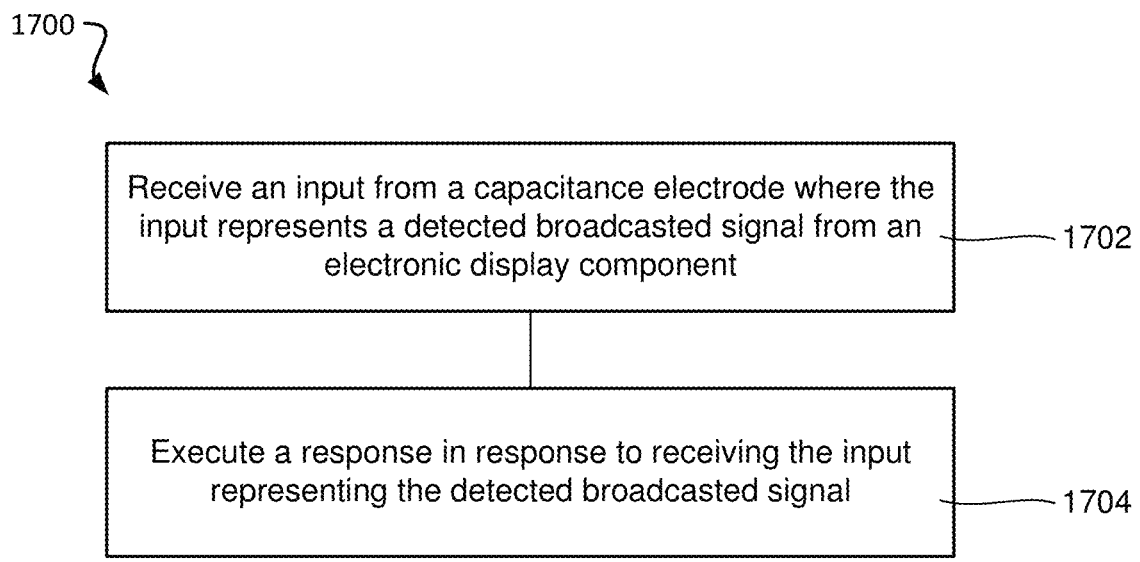
FIG. 17 depicts an example of a method of receiving a broadcasted signal in accordance with the disclosure.

FIG. 17 depicts an example of a method 1700 of receiving a broadcasted signal. This method 1700 may be performed based on the description of the devices, modules, and principles described in relation to FIGS. 1-15. In this example, the method 1700 includes receiving 1702 an input from a capacitance electrode where the input represents a detected broadcasted signal from an electronic display component and executing 1704 a response in response to receiving the input representing the detected broadcasted signal.

Figure 18:
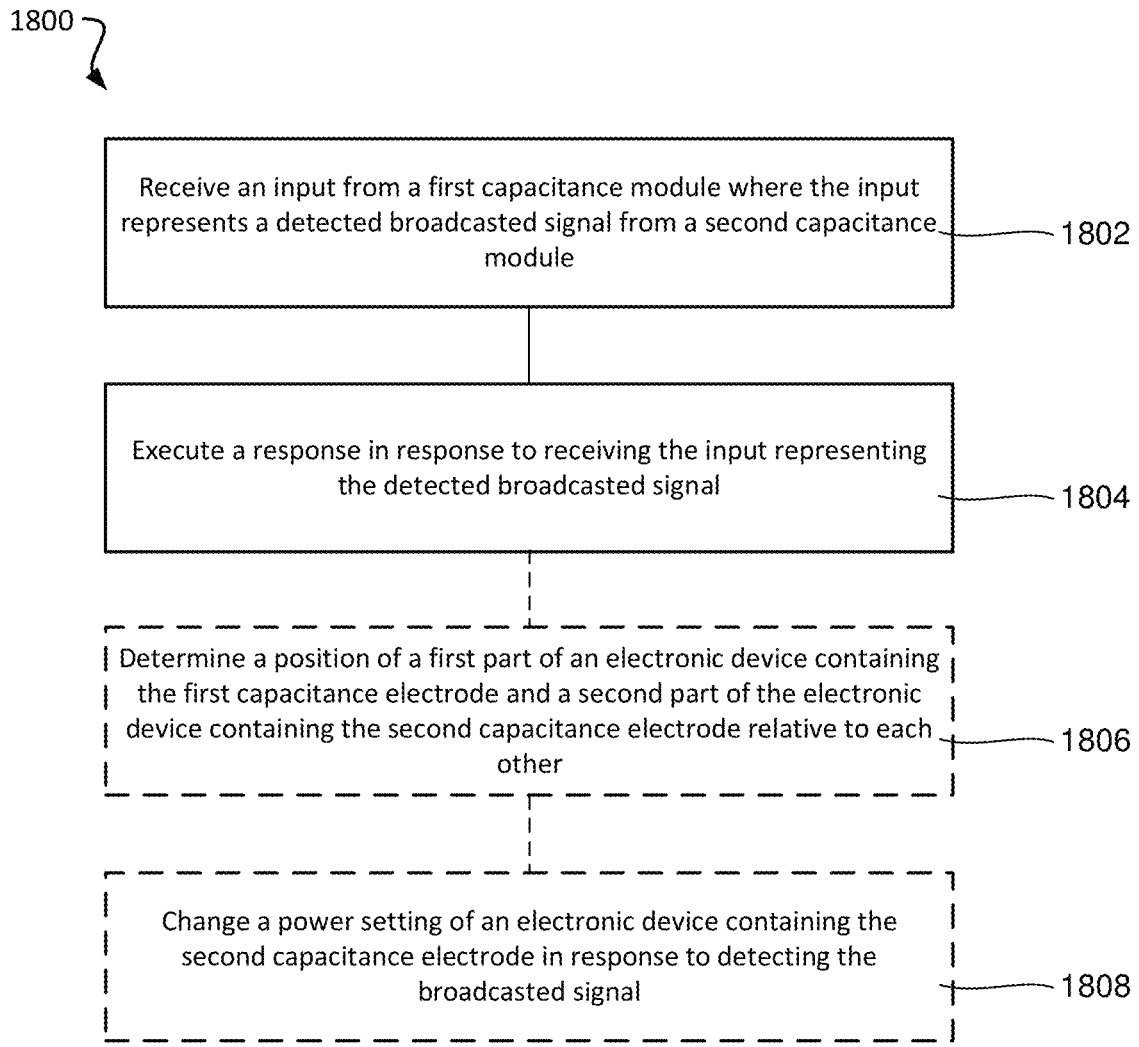
FIG. 18 depicts an example of a method of receiving a broadcasted signal in accordance with the disclosure.

FIG. 18 depicts an example of a method 1800 of receiving a broadcasted signal. This method 1800 may be performed based on the description of the devices, modules, and principles described in relation to FIGS. 1-15. In this example, the method 1800 includes receiving 1802 an input from a first capacitance module where the input represents a detected broadcasted signal from a second capacitance module and executing 1804 a response in response to receiving the input representing the detected broadcasted signal. In some examples, the method 1800 may optionally include determining 1806 a position of a first part of an electronic device containing the first capacitance electrode and a second part of the electronic device containing the second capacitance electrode relative to each other. In some examples, the method 1800 may optionally include changing 1808 a power setting of an electronic device containing the second capacitance electrode in response to detecting the broadcasted signal.

It should be noted that the methods, systems, and devices discussed above are intended merely to be examples. It must be stressed that various embodiments may omit, substitute, or add various procedures or components as appropriate. For instance, it should be appreciated that, in alternative embodiments, the methods may be performed in an order different from that described, and that various steps may be added, omitted, or combined. Also, features described with respect to certain embodiments may be combined in various other embodiments. Different aspects and elements of the embodiments may be combined in a similar manner. Also, it should be emphasized that technology evolves and, thus, many of the elements are exemplary in nature and should not be interpreted to limit the scope of the invention.

Specific details are given in the description to provide a thorough understanding of the embodiments. However, it will be understood by one of ordinary skill in the art that the embodiments may be practiced without these specific details. For example, well-known circuits, processes, algorithms, structures, and techniques have been shown without unnecessary detail in order to avoid obscuring the embodiments.

Also, it is noted that the embodiments may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure.

Having described several embodiments, it will be recognized by those of skill in the art that various modifications, alternative constructions, and equivalents may be used without departing from the spirit of the invention. For example, the above elements may merely be a component of a larger system, wherein other rules may take precedence over or otherwise modify the application of the invention. Also, a number of steps may be undertaken before, during, or after the above elements are considered. Accordingly, the above description should not be taken as limiting the scope of the invention.

The invention claimed is:

1. An electronic device, comprising:
   a first part;
   a second part is movably connected to the second part;
   a first capacitance electrode incorporated into the first part;
   a second capacitance electrode incorporated into the second part;
   a controller in communication with the first capacitance electrode, the second capacitance electrode, or combinations thereof;
   memory in communication with the controller; and
   programmed instructions stored in the memory and configured, when executed, to cause the controller to:
      broadcast a signal with the first capacitance electrode; and
      detect with the broadcasted signal with the second capacitance electrode;
   wherein the first capacitance electrode is incorporated into a first portion of a touch display of the electronic device, and the second capacitance electrode is incorporated into a second portion of a touch display of the electronic device.

2. The electronic device of claim 1, wherein the programmed instructions are further configured, when executed, to determine a position of the first part and the second part relative to each other.

3. The electronic device of claim 1, wherein the programmed instructions are further configured, when executed, to change a power setting of the electronic device in response to detecting the broadcasted signal.

4. The electronic device of claim 1, wherein the first capacitance electrode is incorporated into a touch display.

5. The electronic device of claim 1, wherein the first capacitance electrode is incorporated into a capacitance module of a touch pad.

6. The electronic device of claim 1, wherein the first part is movably connected to the second part with hinged connection.

7. The electronic device of claim 1, wherein the first capacitance electrode is incorporated into a touch display of the electronic device, and the second capacitance electrode is incorporated into a capacitance module associated with a touch pad of the electronic device.

8. The electronic device of claim 1, wherein the first capacitance electrode is incorporated into a capacitance module associated with a touch pad of the electronic device, and the second capacitance electrode is incorporated into a touch display of the electronic device.

9. A computer-program product, the computer-program product comprising a non-transitory computer-readable medium storing instructions executable by a processor to:
   receive an input from a first capacitance module where the input represents a detected broadcasted signal from a second capacitance module; and
   execute a response in response to receiving the input representing the detected broadcasted signal;
   wherein the first capacitance electrode is incorporated into a first portion of a touch display of the electronic device, and the second capacitance electrode is incorporated into a second portion of a touch display of the electronic device.

10. The computer-program product of claim 9, wherein the programmed instructions are further configured, when executed, to determine a position of a first part of an electronic device containing the first capacitance module and a second part of the electronic device containing the second capacitance module relative to each other.

11. The computer-program product of claim 10, wherein the first part is movably connected to the second part with hinged connection.

12. The computer-program product of claim 9, wherein the first capacitance module is incorporated into a touch display.

13. The computer-program product of claim 9, wherein the first capacitance module is incorporated into a capacitance module of a touch pad.

14. The computer-program product of claim 9, wherein the programmed instructions are further configured, when executed, to change a power setting of an electronic device containing the second capacitance electrode in response to detecting the broadcasted signal.

15. A method of detecting a broadcasted signal, comprising:
   receiving an input from a first capacitance module where the input represents a detected broadcasted signal from a second capacitance module; and
   executing a response in response to receiving the input representing the detected broadcasted signal;
   wherein the first capacitance electrode is incorporated into a first touch display of the electronic device, and the second capacitance electrode is incorporated into a second touch display of the electronic device.

16. The method of claim 15, further comprising determining a position of a first part of an electronic device containing the first capacitance module and a second part of the electronic device containing the second capacitance module relative to each other.

17. The method of claim 15, further comprising changing a power setting of an electronic device containing the second capacitance module in response to detecting the broadcasted signal.

18. The method of claim 17, wherein changing the power setting of the electronic device includes turning off the electronic device.

* * * * *